United States Patent [19]
Aoki et al.

[11] Patent Number: 6,122,129
[45] Date of Patent: *Sep. 19, 2000

[54] APPARATUS FOR REPRODUCING SIGNALS FROM A TAPE MEDIUM

[75] Inventors: Osamu Aoki; Hideaki Kondo, both of Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/811,161

[22] Filed: Mar. 4, 1997

Related U.S. Application Data

[63] Continuation of application No. 08/309,452, Sep. 21, 1994, abandoned.

[30] Foreign Application Priority Data

Sep. 27, 1993 [JP] Japan .................................... 5-240180

[51] Int. Cl.[7] .................................................. G11B 15/46
[52] U.S. Cl. .......................................................... 360/73.06
[58] Field of Search .............................. 360/10.3, 10.1, 360/77.13, 22, 10.2, 74.1, 73.03, 73.06, 71, 70, 73.01, 73.08, 77.14; 386/78, 79, 80, 81

[56] References Cited

U.S. PATENT DOCUMENTS

| | | | |
|---|---|---|---|
| 4,470,079 | 9/1984 | Tsuruta | 386/80 X |
| 4,682,247 | 7/1987 | Doutsbo | 360/10.2 |
| 4,698,698 | 10/1987 | Collins | 360/10.3 X |
| 4,703,370 | 10/1987 | Inoue et al. | 386/78 |
| 4,800,447 | 1/1989 | Toba | 386/78 X |
| 4,816,927 | 3/1989 | Rijckaert et al. | 386/78 |
| 4,829,389 | 5/1989 | Fukuda | 386/79 X |
| 4,868,692 | 9/1989 | Nakase et al. | 360/77.16 |
| 4,870,509 | 9/1989 | Nagasawa et al. | 360/10.3 |
| 5,319,500 | 6/1994 | Yu | 360/70 X |
| 5,337,192 | 8/1994 | Fukusawa et al. | 360/10.3 |
| 5,353,173 | 10/1994 | Yoo | 360/76 |
| 5,499,144 | 3/1996 | Inoue et al. | 360/70 X |

OTHER PUBLICATIONS

Webster's II New Riverside University Dictionary, p. 76, 1994.

Primary Examiner—Paul Loomis
Assistant Examiner—K. Wong
Attorney, Agent, or Firm—Frommer Lawrence & Haug, LLP.; William S. Frommer; Bruno Polito

[57] ABSTRACT

An apparatus for reproducing signals which are recorded on a tape to form oblique tracks thereon. The apparatus includes a drum which has a plurality of rotary heads adjoining each other for scanning respective oblique tracks simultaneously to produce reproduced signals. The tape is wrapped around the drum and overlaps a first lead angle so that each of the rotary heads scans a plurality of the oblique tracks during one rotation in a still mode in which the tape is not transported. A control unit is also provided for controlling a rotational speed of the rotary heads and a transport speed of the tape; and a processes unit for processing the reproduced signals.

20 Claims, 20 Drawing Sheets

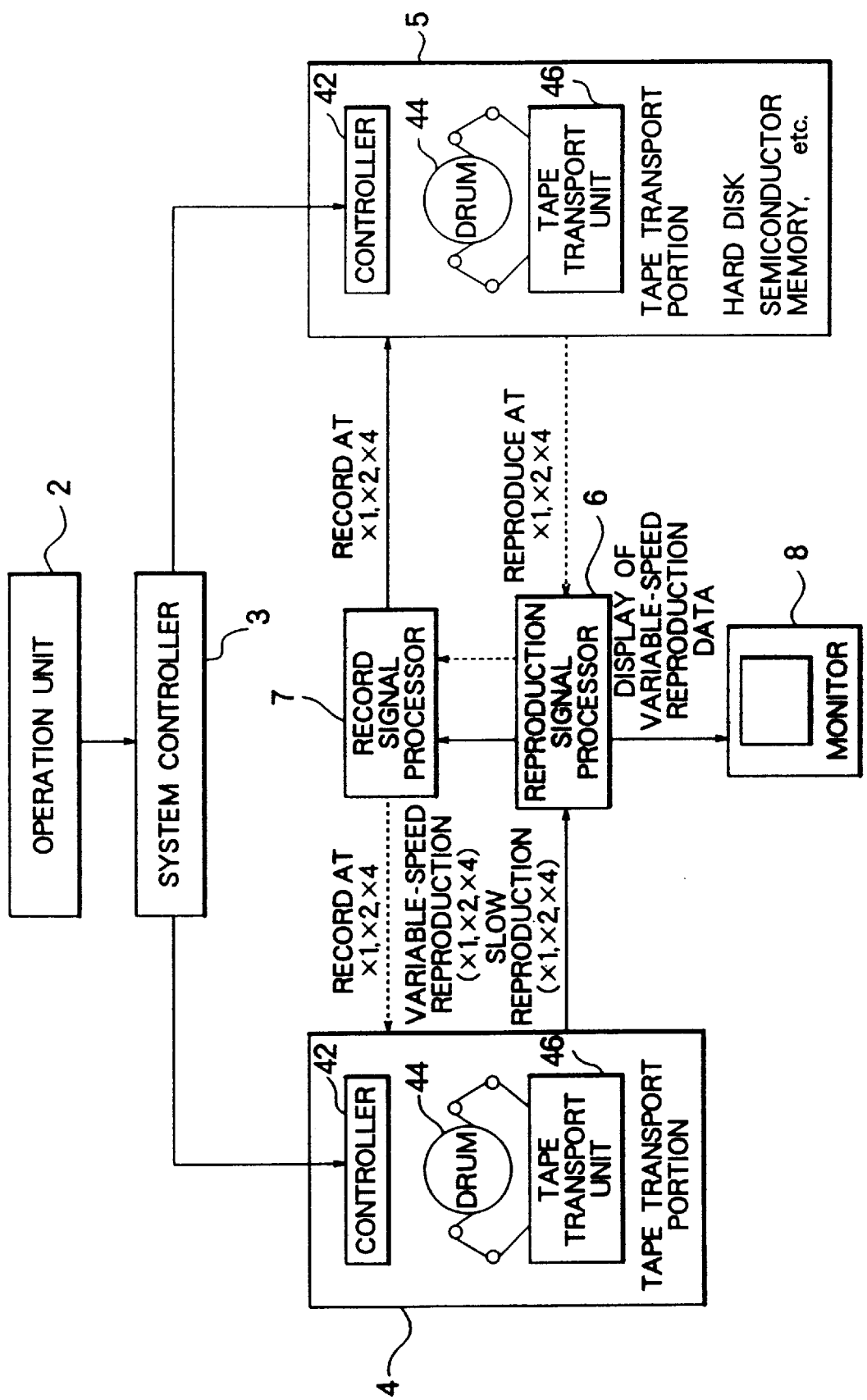

APPARATUS FOR REPRODUCING SIGNALS FROM A TAPE MEDIUM

This application is a continuation of application Ser. No. 08/309,452, filed on Sep. 21, 1994 abandoned.

BACKGROUND OF THE INVENTION

1. Field of the Invention

The present invention relates to a signal reproducing apparatus which can reduce the rotational speed of the heads compared with the past when playing back and recording a magnetic tape.

2. Description of the Related Art

For example, in a video tape recorder (VTR), when playing back and recording a VTR tape, sometimes variable speed playback and variable speed recording are performed at speeds different from the normal playback speed and recording speed.

A VTR tape, as shown in FIG. 1A, is provided with tracks of a pitch Mt at a track angle of θ3 with respect to the longitudinal direction of the tape. These tracks include plus azimuth tracks A and minus azimuth tracks B alternately positioned with each other. The tracks A are read by the head A provided at the position of the upper drum section shown in FIG. 1A and the tracks B by the head B.

In such a VTR tape, when the upper drum section is rotated in the still state where the tape is not being transported, the lead angle of the heads A and B is θ1, but if the tape is transported at 1× speed (normal speed) and the upper drum section of the VTR tape scanner is made to rotate at a rotational speed of 30 rps, the scanning angle of the heads A and B becomes θ3 and so the tracks A and B are accurately scanned.

The lead angle θ1 is for example 5°56'7.4" in the case of the VHS format and 4°53'6" in the case of an 8 mm format.

The track angle θ3 and pitch Mt in a VTR tape are defined as the format.

However, when playing back or recording the VTR tape shown in FIG. 1A at a 2× speed (double speed) by the lead angle θ1 of the heads A and B, if the rotational speed of the upper drum section is not changed and only the transport speed of the VTR tape is doubled, then, as shown in FIG. 1A, the scanning angle of the heads A and B becomes θ2 and, as shown by the horizontal lines in FIG. 1B, only half of the tracks can be scanned.

At this time, if the rotational speed of the drum is doubled, then all of the tracks of the VTR tape can be scanned, but the frequency handled doubles and a need is created for raising the frequency characteristics of the circuits. Further, it suffers from the disadvantage of the hitting to the tape by the head tips, that is, the vibration caused in the tape when the heads A and B move away from and toward the VTR tape.

In particular, during 4× speed (four times speed) playback and recording, the rotational speed of the upper drum section becomes 120 rps and the frequency handled becomes higher, so it suffers from the disadvantage that fabrication of the circuits becomes difficult.

To overcome the above-mentioned disadvantages, there is known the dynamic tracking head (DT) system, in which use is made of a drum with a normal lead angle and diameter, but the number of heads is doubled so that even when the transport speed of the tape is doubled, all tracks of a VTR tape can be suitably scanned while causing the upper drum section to rotate at a rotational speed of 30 rps (revolution per second).

By using the dynamic tracking head system, even for example when performing 4× speed playback and/or 4× speed recording, the rotational speed of the upper drum section may be made 60 rps and circuits of a frequency able to be handled can be fabricated.

If the dynamic tracking head system is used, however, a circuit for driving the dynamic tracking heads becomes necessary. Further, a position sensor becomes necessary for controlling the head height when recording. Therefore, it suffers from the disadvantage of the construction of the drum becoming complicated.

Further, in a VTR tape, as shown in FIG. 1A, pilot signals having a frequency characteristic of a frequency f0 are recorded on the even number tracks, while pilot signals having frequency characteristics of frequencies f1 and f2 are recorded alternately on the odd number tracks.

In a VTR, when a head scans an even number track, the ratio between the f1 pilot signals and f2 pilot signals recorded on the odd number tracks at the two sides is detected so as to perform tracking servo control, that is, ATF servo control. When scanning an odd number track, ATF tracking servo control is not performed.

Therefore, when scanning an odd number track, the track scanning precision depends on the precision of the relative mount height and distance between the head scanning the even number track and the head scanning the odd number track.

Accordingly, when the precision of the mount heights of the two heads is low or when the distance between the two heads is long, the tracks subjected to positional control by the AFT servo control can be suitably scanned, but the other tracks suffer from the effect of head height error due to vibration of the drum face and so the problem arises of tracking deviation.

SUMMARY OF THE INVENTION

An object of the present invention is to provide a signal reproducing apparatus which can suitably perform variable speed playback and variable speed recording without making the construction of the drum complicated.

According to the present invention, there is provided an apparatus for reproducing signals which are recorded on a tape to form oblique tracks thereon, the apparatus including a drum which has a plurality of rotary heads adjoining each other for scanning respective oblique tracks simultaneously to produce reproduced signals and which has the tape wrapped around it overlapped at a first lead angle so that each of the rotary heads scans a plurality of the oblique tracks at one rotation in a still mode in which the tape is not transported; a control means for controlling a rotational speed of the rotary heads and a transport speed of the tape; and a processing means for processing the reproduced signals.

Preferably, the processing means includes a plurality of memories for storing the reproduced signals from the rotary heads, a memory controlling means for controlling the timing of output of the stored reproduced signals from the memories, and a signal combining means for combining the reproduced signals output from the memories.

More preferably, the control means controls the rotational speed of the rotary heads so that they scan the oblique tracks in response to a desired transport speed of the tape.

Still more preferably, the processing means comprises a plurality of memories for storing the reproduced signals from the rotary heads, a memory controlling means for controlling the timing of output of the stored reproduced signals from the memories, and switching means for switching the reproduced signals output from the memories.

Further preferably, the drum has a first and a second rotary heads adjoining each other, the first lead angle is determined so that the each of the first and second rotary heads scans two adjacent tracks at one scan in the still mode, and the control means controls the rotational speed of the first and second rotary heads and the transport speed so that each of the first and secondary rotary heads scans the adjacent oblique track to produce first and second reproduced signals.

Desirably, the processing means comprises first and second memories for storing the first and second reproduced signals from the first and second rotary heads respectively, a memory controlling means for controlling the timing of output of the stored reproduced signals from the first and second memories, and a switching means for switching the first and second reproduced signals from the first and second memories to output one of the first and second reproduced signals.

Further desirably, the first and second reproduced signals, in a normal speed playback mode, are output from the first and second memory means at a speed twice as fast as the speed of storage into the first and second memories to be time compressed.

Also desirably, the switching means switches the first and second reproduced signals from the first and second memories to output one of a half portion of the first reproduced signal and a half of the second reproduced signal.

Additionally, in a low speed mode in which the tape is transported at a speed lower than a normal speed or in a reverse mode in which the tape is transported in a reverse direction, the control means controls the rotational speed of the rotary heads so they traverse a plurality of the oblique tracks to partially reproduce signals in response to a desired transport speed of the tape and wherein the control processing means comprises rearrangement means for rearranging the partially reproduced data from the oblique tracks reproduced by the plurality of rotary heads.

BRIEF DESCRIPTION OF THE DRAWINGS

These and other objects and features of the present invention will be more apparent from the ensuing description of the preferred embodiments, in which:

FIGS. 10A and 10B are views for explaining the scanning region of heads of the VTR of the second embodiment, wherein FIG. 10A is a view showing the tracks drawn perpendicular with respect to the transport direction of the tape for simplification and FIG. 10B is a view showing the tracks drawn inclined with a certain angle with respect to the transport direction of the tape close to the actual format;

FIGS. 13A and 13B are views for explaining the scanning region of heads of the VTR of the second embodiment in the case of selection of 15 rps as the rotational speed of the drum, wherein FIG. 13A is a view showing the tracks drawn perpendicular with respect to the transport direction of the tape for simplification and FIG. 13B is a view showing the tracks drawn inclined with a certain angle with respect to the transport direction of the tape close to the actual format;

FIGS. 14A and 14B are views for explaining the scanning region of heads of the VTR of the embodiment in the case of selection of 35 rps as the rotational speed of the drum, wherein FIG. 14A is a view showing the tracks drawn perpendicular with respect to the transport direction of the tape for simplification and FIG. 14B is a view showing the tracks drawn inclined with a certain angle with respect to the transport direction of the tape close to the actual format;

FIGS. 18A and 18B are views for explaining the scanning region of heads of the VTR shown in FIG. 17; wherein FIG. 18A is a view showing the tracks drawn perpendicular with respect to the transport direction of the tape for simplification and FIG. 18B is a view showing the tracks drawn inclined with a certain angle with respect to the transport direction of the tape close to the actual format, with FIGS. 18A and 18B being substantially the same;

FIG. 20 is a view for explaining another example of the signal reproducing apparatus of the present invention.

DESCRIPTION OF THE PREFERRED EMBODIMENTS

An explanation will be now made of a first embodiment of the present invention.

In this embodiment, an explanation will be made of a video tape recorder (VTR) for playing back from and recording on a VTR tape run in the forward direction at transport speeds of 1× speed (normal speed) or more, e.g., 2× speed (double speed), and 4× speed (four times speed).

Figure 2:
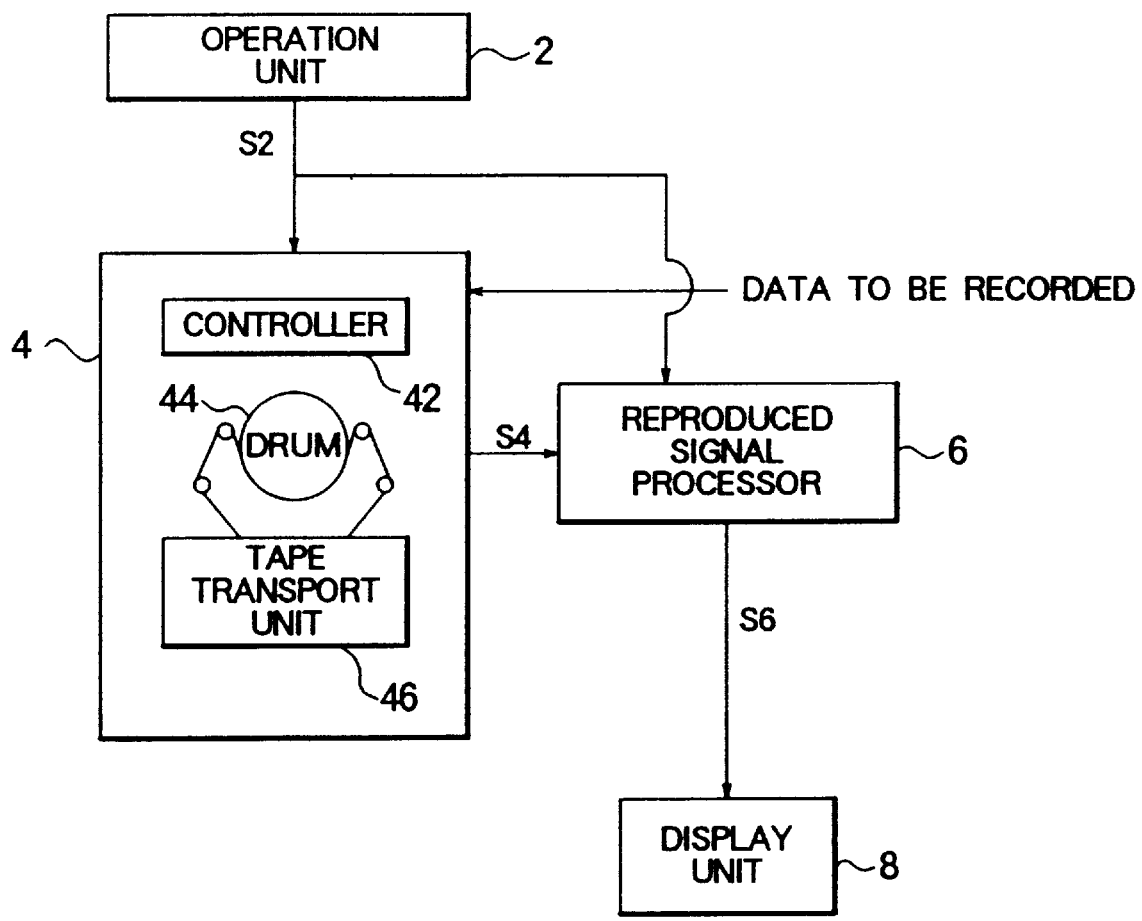
FIG. 2 is a view of the configuration of a VTR of a first embodiment.

FIG. 2 is a view of the configuration of the VTR of the present embodiment.

As shown in FIG. 2, the VTR of this embodiment is comprised of an operation panel 2, a tape transport mechanism 4, a reproduced signal processing unit 6, and a display monitor 8.

The operation panel 2 for example has a recording button, stop button, injection button, and jog shuttle controllers for variable speed playback and variable speed recording. An operating signal S2 corresponding to the operation of the buttons etc. by the user is output to a controller 42 of the tape transport mechanism 4.

The tape transport mechanism 4 has mainly a controller 42, a rotary drum 44, and a tape transport unit 46 and is controlled in the rotational speed of the upper drum section of the drum 44 and the transport speed of the VTR tape of the tape transport unit 46 based on the control signal from the controller 42 corresponding to the operating signal S2.

Figure 3A:
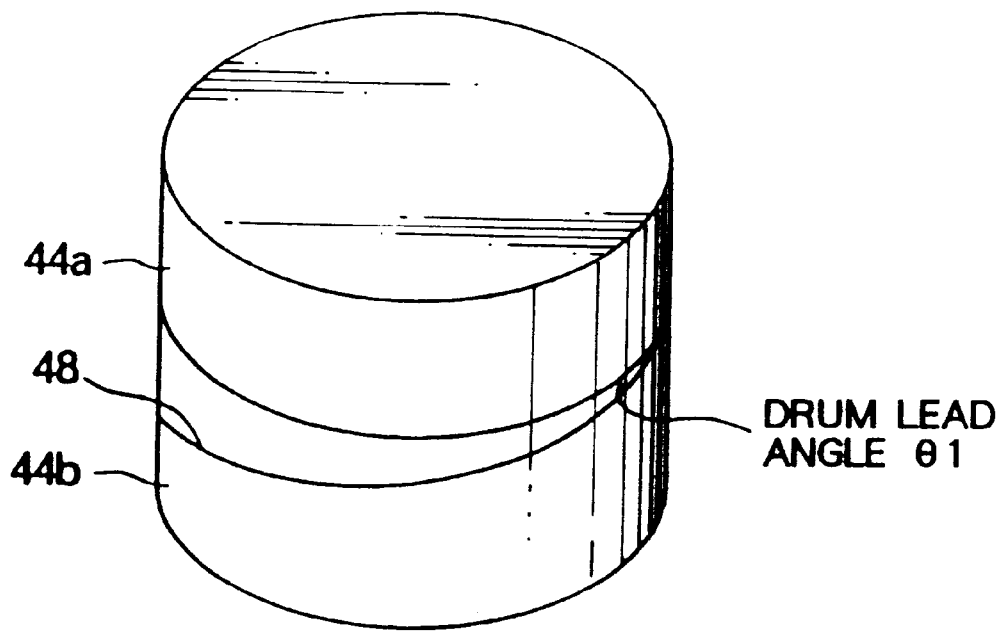
FIG. 3A is a schematic view of the outside of a drum.
Figure 3B:
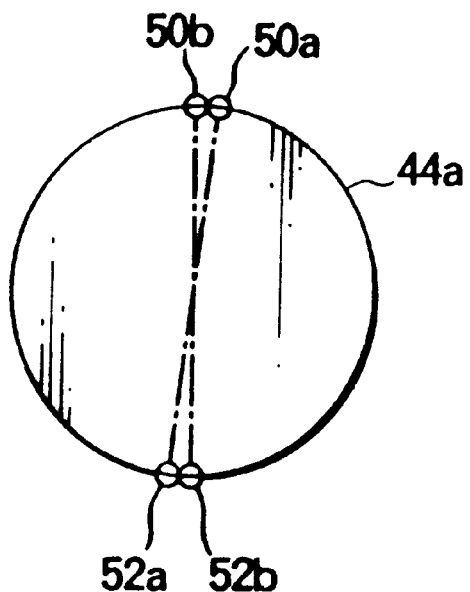
FIG. 3B is a view for explaining the position of heads provided on an upper drum section.

FIG. 3A is a view for explaining the angle of the lead formed at a lower drum section 44b of the drum 44. FIG. 3B is a view for explaining the position of the heads provided at a upper drum section 44a shown in FIG. 3A.

As shown in FIG. 3A, a lead 48 of a lead angle θ1 is formed at a lower drum section 44b. The VTR tape is transported along the lead 48.

Figure 4:
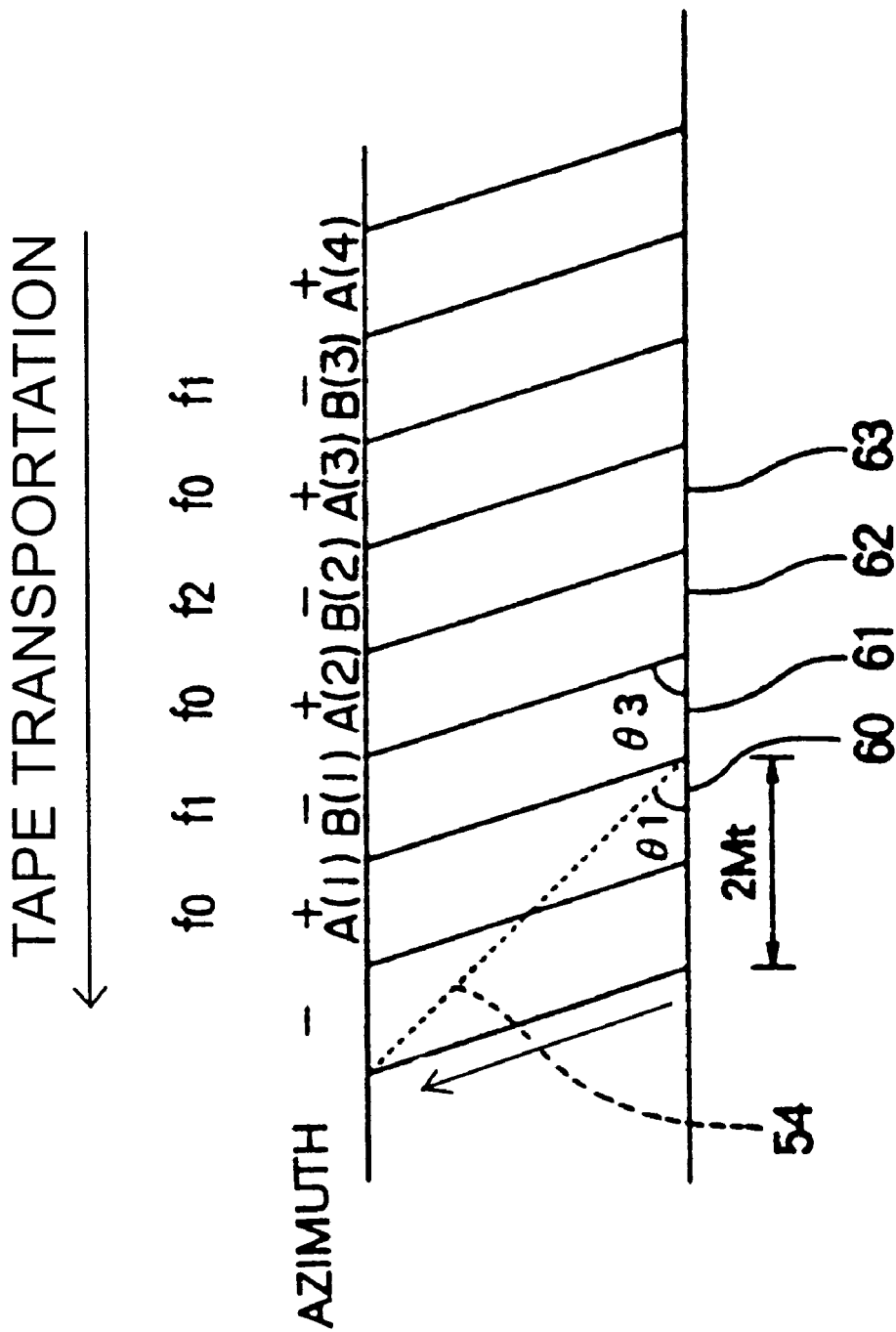
FIG. 4 is a view for explaining the scanning angle of heads of the VTR shown in FIG. 2.

The lead angle θ1, as shown in FIG. 4, is an acute angle formed between the longer diagonal line in the region formed by two adjoining tracks on the VTR tape and the longitudinal direction of the tape. When the VTR tape is in the still state, magnetic heads 50a, 50b, 52a, and 52b scan along the path 54 shown by the dotted line in accordance with the rotation of the upper drum section.

Accordingly, if the VTR tape is transported at 2× speed and the upper drum section is made to rotate at a rotational speed of 30 rps, the heads 50a, 50b, 52a, and 52b scan the tracks at a track angle of θ3.

Figure 1A:
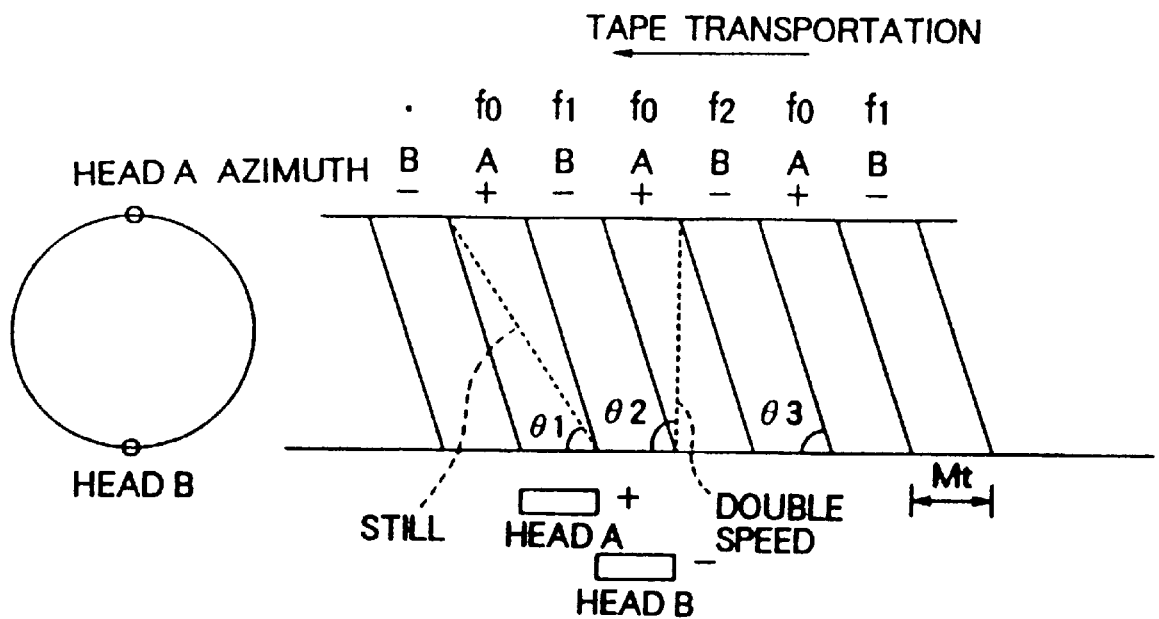
FIG. 1A is a view for explaining the scanning angle of a conventional VTR.
Figure 1B:
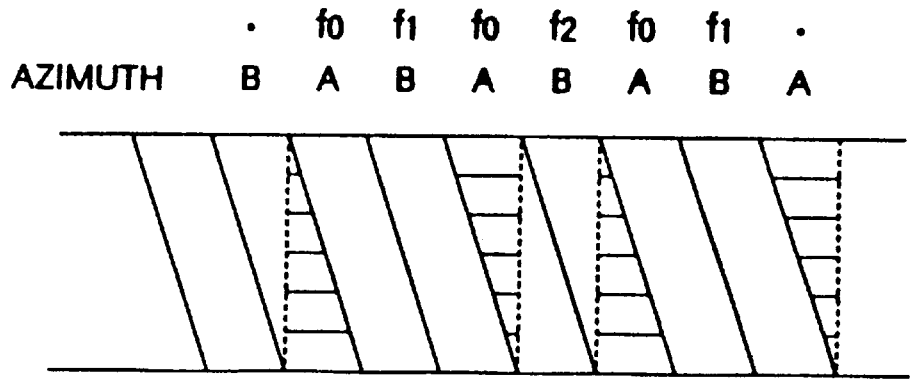
FIG. 1B is a view for explaining a scanning region of heads in the case of making the rotational speed of the upper drum section 30 rps and the tape scanning speed 2× speed.

In this way, since the lead of the upper drum section is formed at a lead angle θ1 smaller than the lead angle θ1' shown in FIG. 1, when the transport speed of the VTR tape is for example made 2× speed, the heads 50a, 50b, 52a, and 52b suitably scan the tracks of the VTR tape by making the upper drum section rotate at the rotational speed of 30 rps used when scanning at 1× speed in the VTR shown in FIG. 1.

The lead angle θ1 is for example 4°51'58.8" in the case of an 8 mm format, which is smaller than the 4°053'16" of the lead angle θ1' shown in FIG. 1.

Further, the upper drum section 44a shown in FIG. 3A is provided with the heads 50a and 50b and heads 52a and 52b at opposing positions as shown in FIG. 3B. The heads 50a and 52a scan the plus azimuth tracks among the tracks of the VTR tape, while the heads 50b and 52b scan the minus azimuth tracks.

Further, the adjoining heads 50a and 50b and heads 52a and 52b simultaneously scan the adjoining tracks of the VTR tape, respectively.

The heads 50a, 50b, 52a, and 52b have both or either of the function of reading audio signals recorded on the tracks of the VTR tape, for example, and the function of recording audio signals on the tracks.

The tape transport unit 46 transports the VTR tape at a tape transport speed of at least 1× speed, for example, 1× speed, 2× speed, or 4× speed, based on the control signal from the controller 42.

The reproduced signal processing unit 6 receives as input the signals S50a, S50b, S52a, and S52b read from the heads 50a, 50b, 52a, and 52b provided on the upper drum section 44a of the drum 44, converts these read signals into a display signal S6, and outputs the same to the monitor 8.

Figure 5:
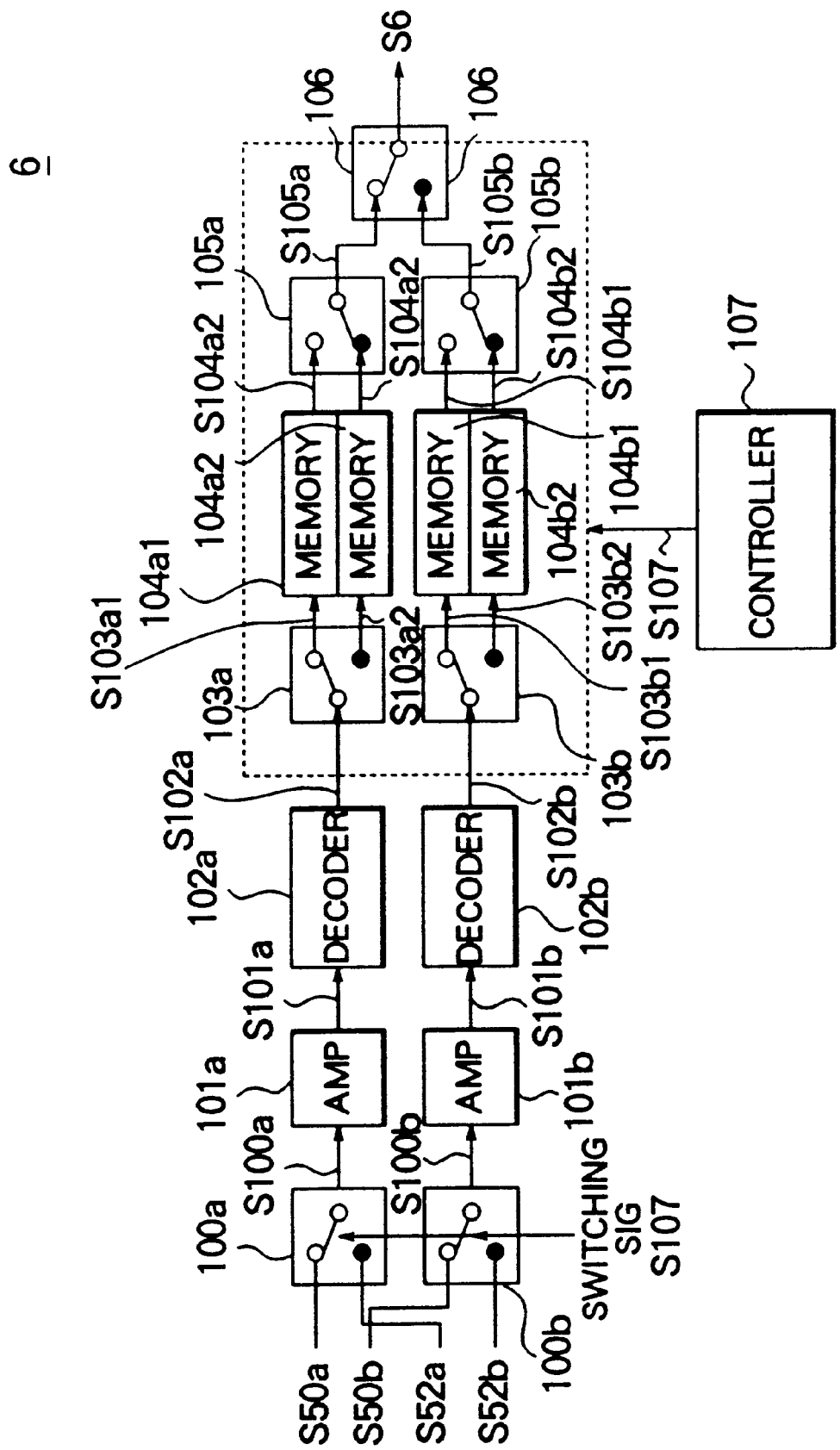
FIG. 5 is a view of the configuration of a reproduced signal processing unit in the first embodiment.

FIG. 5 is a view of the configuration of the reproduced signal processing unit 6.

As shown in FIG. 5, the reproduced signal processing unit 6 is comprised of change-over switches 100a and 100b, reproduced RF amplifiers 101a and 101b, demodulation circuits 102a and 102b, change-over switches 103a and 103b, memories 104a1, 104a2, 104b1, and 104b2, change-over switches 105a and 105b, a change-over switch 106, and a control circuit 107.

The change-over switch 100a receives as input the signals S50a and S52a read from the heads 50a and 52b and outputs one of the same to the reproduced RF amplifier 101a based on the change-over signal S107 from the control circuit 107.

The change-over switch 100b receives as input the signals S50b and S52b read from the heads 50b and 52a and outputs one of the same to the reproduced RF amplifier 101b based on the change-over signal S107 from the control circuit 107.

The reproduced RF amplifiers 101a and 101b amplify the read signals S100a and S100b from the change-over switches 100a and 100b and output the results to the demodulation circuits 102a and 103b.

The demodulation circuits 102a and 102b receive as input the amplified read signals S101a and S101b from the reproduced RF amplifiers 101a and 101b, demodulate them, and output the results to the change-over switches 103a and 103b.

The change-over switch 103a selectively outputs the read signal S102a input from the demodulation circuit 102a to the memory 104a1 and memory 104a2 based on the change-over signal S107 from the control circuit 107.

The change-over switch 103b selectively outputs the read signal S102b input from the demodulation circuit 102b to the memory 104b1 and memory 104b2 based on the change-over signal S107 from the control circuit 107.

The change-over switch 105a selectively outputs the read signals stored in the memories 104a1 and 104a2 to the change-over switch 106 based on the change-over signal S107 from the control circuit 107.

The change-over switch 105b selectively outputs the read signals stored in the memories 104b1 and 104b2 to the change-over switch 106 based on the change-over signal S107 from the control circuit 107.

The change-over switch 106 outputs the read signals S105a and S105b input from the change-over switches 105a and 105b selectively as the output signal S6 to the display monitor 8 shown in FIG. 2.

The monitor 8 has a display and shows on the display an image based on the reproduced signal S6 from the reproduced signal processing unit 6.

The operation of the VTR of the above embodiment will now be explained.

The case of playback at 2× speed will be given as an example.

The user first depresses the playback button on the operation panel 2 and designates 2× speed by the jog controller. Then, an operating signal S2 corresponding to the user's operation is output to the controller 42 of the tape transport mechanism 4 from the operation panel 2.

Further, a control signal corresponding to the operating signal S2 is output from the controller 42 to the drum 44 and the tape transport unit 46.

Based on the control signal, the upper drum section 44a rotates at a rotational speed of 30 rps and the tape transport unit 46 transports the VTR tape at 2× speed.

By this, the heads 50a, 50b, 52a, and 52b provided on the drum 44 move along the track angle θ3 of the VTR tape and suitably scan the tracks.

At this time, the adjoining plus and minus azimuth tracks are simultaneously scanned by the heads 50a and 50b. The plus azimuth tracks adjoining scanned minus tracks and the minus azimuth tracks adjoining scanned plus tracks are simultaneously scanned by the heads 52a and 52b.

For example, in FIG. 4, the tracks 60 and 61 are simultaneously scanned by the heads 50a and 50b and then the tracks 62 and 63 are simultaneously scanned by the heads 52a and 52b.

In this way, all the tracks on the VTR tape are scanned successively by the heads 50a, 50b, 52a, and 52b.

By the scanning of the tracks by the heads 50a, 50b, 52a, and 52b, the signals, for example, audio signals, recorded on the tracks are read. The read data is output to the reproduced signal processing unit 6.

The read data is converted to a display signal in the reproduced signal processing unit 6. The display signal S6 is output to the monitor 8.

The processing in the reproduced signal processing unit 6 will be explained now in detail referring to the timing of processing shown in FIG. 6.

During 2× speed playback, the drum 44 shown in FIGS. 3A and 3B rotates a half in one field of time and two adjoining tracks shown in FIG. 4 are read at the same time. That is, the reading time per track is the same as with normal reading, but in the present embodiment, two tracks are simultaneously read.

Figure 6:
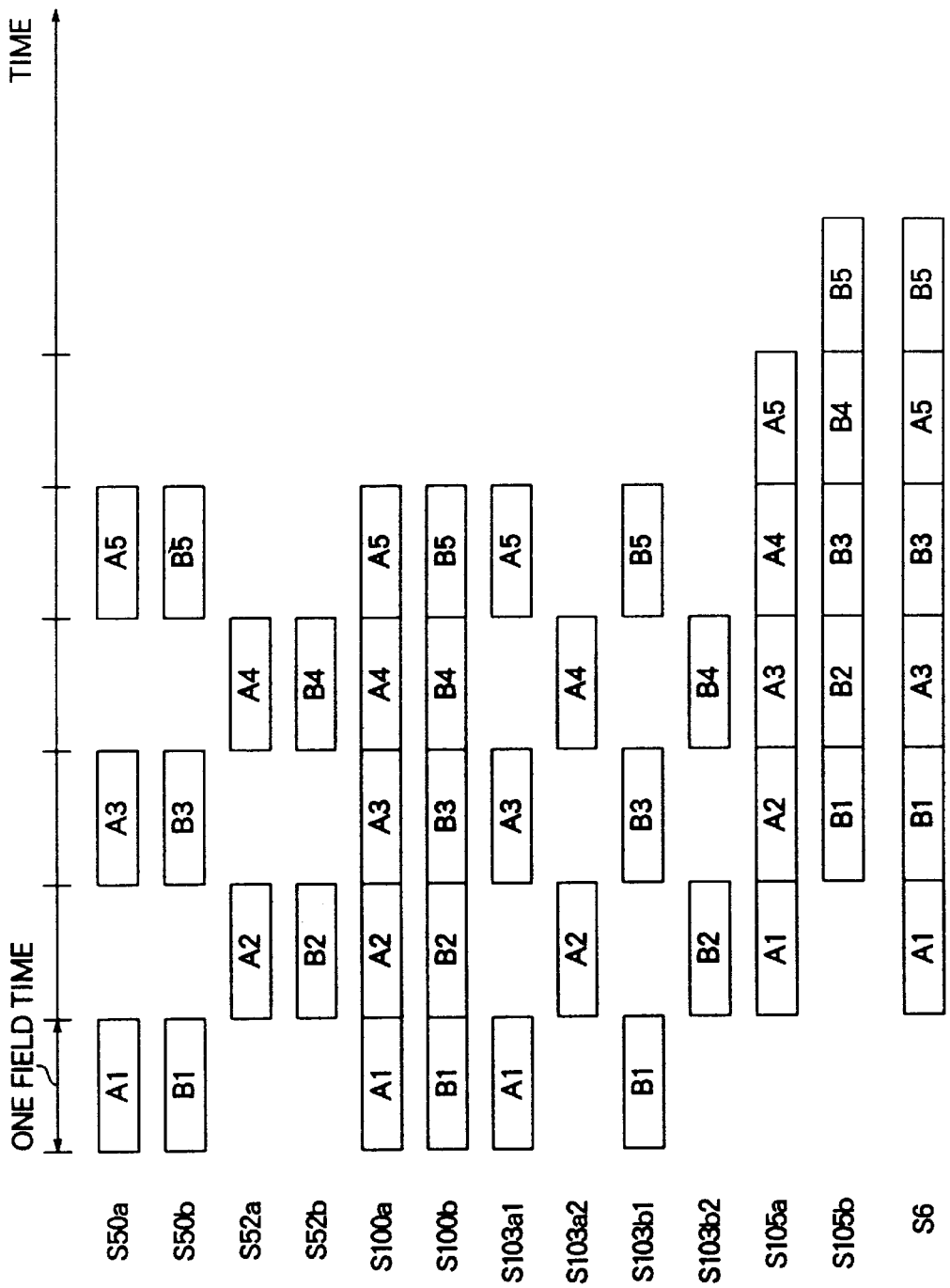
FIG. 6 is a timing chart of the processing of the reproduced signal processing unit shown in FIG. 5 in the case of 2× speed playback in the first embodiment.

At this time, the signals S50a, S50b, S52a, and S52b read from the heads 50a, 50b, 52a, and 52b are output to the change-over switches 100a and 100b at the timings shown in FIG. 6.

That is, as shown in FIG. 6, in the first one field of time, the signal S50a of the track A1 read by the head 50a is output to the change-over switch 100a and, at the same time, the signal S50b of the track B1 read by the head 50b is output to the change-over switch 100b.

In the next field of time, the signal S52a of the track A2 read by the head 52a is output to the change-over switch 100a and the signal S52b of the track B2 read by the head 52b is output to the change-over switch 100b.

Similarly, from then on, the read signals S50a and S50b of the adjoining tracks $A_{2n+1}$ (n=1, 2 . . . ) and $B_{2n+1}$ (n=1, 2 . . . ) are simultaneously output to the change-over switches 100a and 100b and the read signals S52a and S52b of the adjoining tracks $A_{2n}$ (n=2, 3 . . . ) and $B_{2n}$ (n=2, 3 . . . ) are simultaneously output to the change-over switches 100a and 100b.

When the read signals S50a and S52a of the track A are input at the timings shown in FIG. 6 to the change-over switch 100a, the switch is switched every one field of time and the read signal S100a shown in FIG. 6 is output to the reproduced RF amplifier 101a.

In the same way, when the read signals S50b and S52b of the track B are input at the timings shown in FIG. 6 to the change-over switch 100b, the switch is switched every one field of time and the read signal S100b shown in FIG. 6 is output to the reproduced RF amplifier 101b.

At the reproduced RF amplifiers 101a and 101b, the read signals S100a and S100b are amplified and the results output as the read signals S101a and S101b to the demodulation circuits 102a and 102b. The read signals S101a and S101b are demodulated at the demodulation circuits 102a and 102b and are output as the read signals S102a and S102b to the change-over switches 103a and 103b.

At the change-over switch 103a, the input read signal S102a is output switched to the memories 104a1 and 104a2 every one field of time and is stored in the memories 104a1 and 104a2. Specifically, as shown in FIG. 6, the read signal S103a1 of the track A1 is stored in the memory 104a1 and the read signal S103a2 of the track A2 is stored in the memory 104a2. In the same way, the read signal S103a1 of the track $A_{2n+1}$ (n=1, 2 . . . ) is stored in the memory 104a1 and the read signal S103a2 of the track $A_{2n}$ (n=2, 3 . . . ) is stored in the memory 104a2.

In the same way, at the change-over switch 103b, the input read signal S102b is output switched to the memories 104b1 and 104b2 every one field of time and is stored in the memories 104b1 and 104b2. Specifically, as shown in FIG. 6, the read signal S103b1 of the track B1 is stored in the memory 104b1 and the read signal S103b2 of the track B2 is stored in the memory 104b2. In the same way, the read signal S103b1 of the track $B_{2n+1}$ (n=1, 2 . . . ) is stored in the memory 104b1 and the read signal S103b2 of the track $B_{2n}$ (n=2, 3 . . . ) is stored in the memory 104b2.

The read signals stored in the memories 104a1 and 104a2 are output to the change-over switch 106 as the read signal S105a as shown in FIG. 6 by the switching in the change-over switch 105a every one field of time.

The read signals stored in the memories 104b1 and 104b2 are output to the change-over switch 106 as the read signal S105b as shown in FIG. 6 by the switching of the change-over switch 105b every one field of time.

The read signals S105a and S105b are output to the monitor 8 shown in FIG. 2 as the read signal S6 shown in FIG. 6 by the switching at the change-over switch 106. At this time, the display signal S6 is output skipping every two tracks. If the signal written on one track corresponds to one field of time, then it is output skipping one frame. That is, the display signal S6 is equivalent to a 2× speed reproduced signal.

In the monitor 8, the 2× speed image corresponding to the display signal S6 is output on the display monitor.

As explained above, in the VTR of the present embodiment, when performing playback at 2× speed, the rotational speed of the upper drum section 44a becomes 30 rps, which is a lower speed compared with the 60 rps of the conventional rotational speed, but since the lead angle θ1 is suitably set, the tracks of the VTR tape are suitably scanned.

Further, since there are four heads 50a, 50b, 52a, and 52b, all tracks of the VTR head are scanned.

In the above example, reference was made to the case of playback at 2× speed, but when playing back at 1× speed or 4× speed, by making the rotational speed of the drum 15 rps at the time of 1× speed and 60 rps at the time of 4× speed, all of the tracks can be suitably scanned for playback by the heads 50a, 50b, 52a, and 52b.

In this way, in the VTR of this embodiment, the rotational speed of the drum is a slow 15 rps at 1× speed, so there is no problem with the circuit.

The processing in the reproduced signal processing unit 6 shown in FIGS. 2 and 5 performing 1× speed playback will be explained now in detail referring to the timing of processing shown in FIG. 7.

During 1× speed playback, the rotational speed of the drum 44 shown in FIGS. 3A and 3B is 15 rps. The drum 44 rotates a half in two fields of time and two adjoining tracks shown in FIG. 4 are read at the same time.

Figure 7:
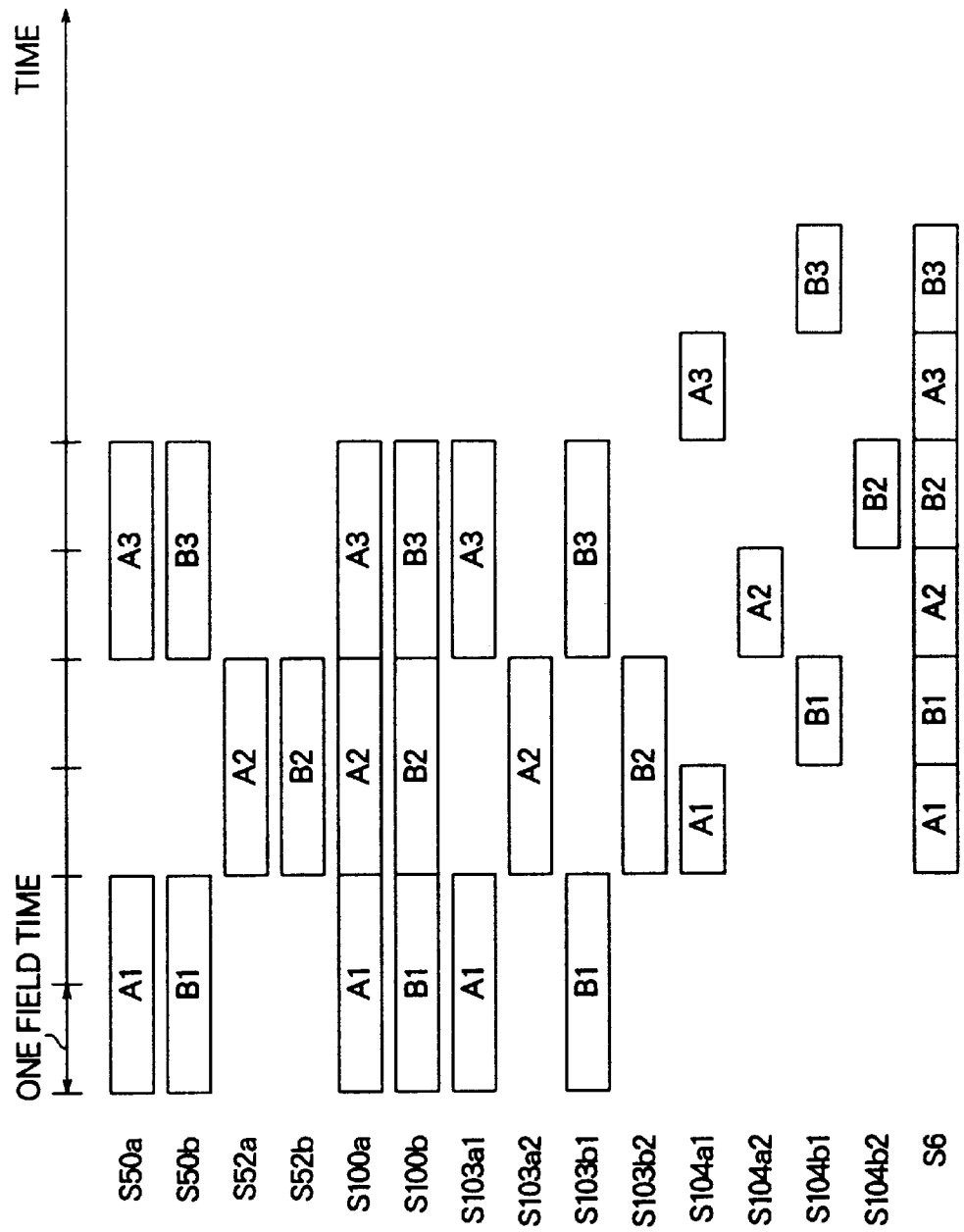
FIG. 7 is a timing chart of the processing of the reproduced signal processing unit shown in FIG. 5 in the case of 1× speed playback in the first embodiment.

At this time, the signals S50a, S50b, S52a, and S52b read from the heads 50a, 50b, 52a, and 52b shown in FIG. 3 are output to the change-over switches 100a and 100b shown in FIG. 5 at the timings shown in FIG. 7.

That is, as shown in FIG. 7, in the first two fields of time, the signal S50a of the track A1 read by the head 50a is output to the change-over switch 100a and, at the same time, the signal S50b of the track B1 read by the head 50b is output to the change-over switch 100b.

In the next two fields of time, the signal S52a of the track A2 read by the head 52a is output to the change-over switch 100a and the signal S52b of the track B2 read by the head 52b is output to the change-over switch 100b.

Similarly, from then on, the read signals S50a and S50b of the adjoining tracks $A_{2n+1}$ (n=1, 2 . . . ) and $B_{2n+1}$ (n=1, 2 . . . ) are simultaneously output to the change-over switches 100a and 100b and the read signals S52a and S52b of the adjoining tracks $A_{2n}$ (n=2, 3 . . . ) and $B_{2n}$ (n=2, 3 . . . ) are simultaneously output to the change-over switches 100a and 100b.

When the read signals S50a and S52a of the track A are input at the timings shown in FIG. 7 to the change-over switch 100a, the switch is switched every two fields of time and the read signal S100a shown in FIG. 7 is output to the reproduced RF amplifier 101b.

In the same way, when the read signals S50b and S52b of the track B are input at the timings shown in FIG. 7 to the change-over switch 100b, the switch is switched every two fields of time and the read signal S100b shown in FIG. 7 is output to the reproduced RF amplifier 101b.

At the reproduced RF amplifiers 101a and 101b, the read signals S100a and S100b are amplified and the results output as the read signals S101a and S101b to the demodulation circuits 102a and 102b. The read signals S101a and S101b are demodulated at the demodulation circuits 102a and 102b and are output as the read signals S102a and S102b to the change-over switches 103a and 103b.

At the change-over switch 103a, the input read signal S102a is output switched to the memories 104a1 and 104a2 every two fields of time and is stored in the memories 104a1 and 104a2. Specifically, as shown in FIG. 7, the read signal S103a1 of the track A1 is stored in the memory 104a1 and the read signal S103a2 of the track A2 is stored in the memory 104a2. In the same way, the read signal S103a1 of the track $A_{2n+1}$ (n=1, 2 . . . ) is stored in the memory 104a1 and the read signal S103a2 of the track $A_{2n}$ (n=2, 3 . . . ) is stored in the memory 104a2.

In the same way, at the change-over switch 103b, the input read signal S102b is output switched to the memories 104b1 and 104b2 every two fields of time and is stored in the memories 104b1 and 104b2. Specifically, as shown in FIG. 7, the read signal S103b1 of the track B1 is stored in the memory 104b1 and the read signal S103b2 of the track B2 is stored in the memory 104b2. In the same way, the read signal S103b1 of the track $B_{2n+1}$ (n=1, 2 . . . ) is stored in the memory 104b1 and the read signal S103b2 of the track $B_{2n}$ (n=2, 3 . . . ) is stored in the memory 104b2.

The read signals stored in the memories 104a1 and 104a2 are output to the change-over switch 105a as the read signals S104a1 and S104a2 as shown in FIG. 7 by the switching in the change-over switch 105a. The read signals output to the change-over switch 105a are output as the read signal S105a to the change-over switch 106 by the switching of the change-over switch 105a.

The read signals stored in the memories 104b1 and 104b2 are output to the change-over switch 105b as the read signals S104b1 and S104b2 as shown in FIG. 7 by the switching in the change-over switch 105b. The read signals output to the change-over switch 105b are output as the read signal S105b to the change-over switch 106 by the switching of the change-over switch 105b.

The read signals S105a and S105b are output to the monitor 8 shown in FIG. 2 as the read signal S6 shown in FIG. 7 by the switching at the change-over switch 106.

The processing in the reproduced signal processing unit 6 shown in FIGS. 2 and 5 performing 4× speed playback will be explained now in detail referring to the timing of processing shown in FIG. 8.

During 4× speed playback, the rotational speed of the drum 44 shown in FIGS. 3A and 3B is 60 rps. The drum 44 rotates a half in ½ field of time and two adjoining tracks shown in FIG. 4 are read at the same time. In this way, even at 4× speed, the rotational speed of the drum is about 60 rps and the frequency handled is not that high, so the fabrication of the circuits is not that difficult.

Figure 8:
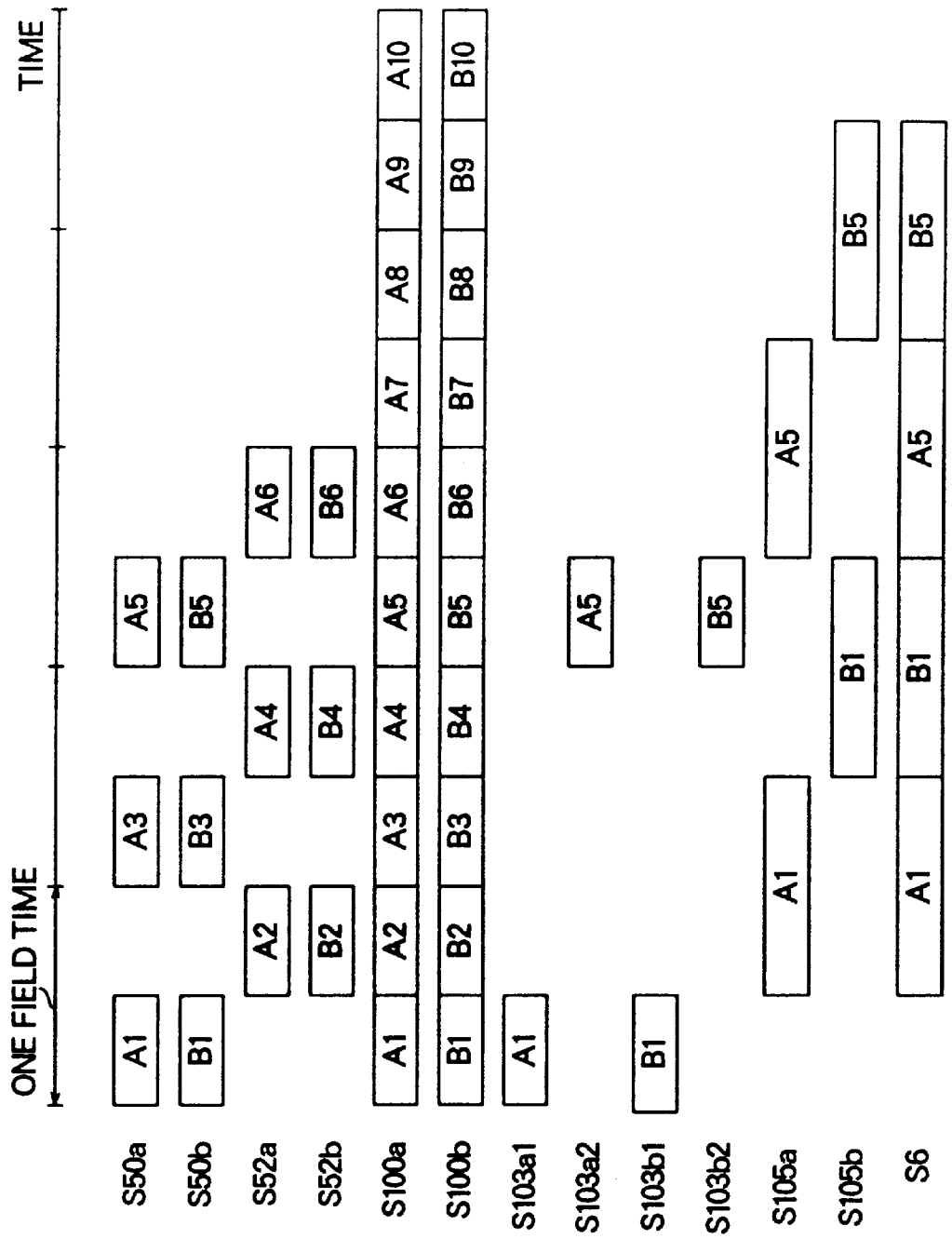
FIG. 8 is a timing chart of the processing of the reproduced signal processing unit shown in FIG. 5 in the case of 4× speed playback in the first embodiment.

In 4× speed playback, the signals S50a, S50b, S52a, and S52b read from the heads 50a, 50b, 52a, and 52b are output to the change-over switches 100a and 100b at the timings shown in FIG. 8.

That is, as shown in FIG. 8, in the first ½ field of time, the signal S50a of the track A1 read by the head 50a is output to the change-over switch 100a and, at the same time, the signal S50b of the track B1 read by the head 50b is output to the change-over switch 100b.

In the next ½ field of time, the signal S52a of the track A2 read by the head 52a is output to the change-over switch 100a and the signal S52b of the track B2 read by the head 52b is output to the change-over switch 100b.

Similarly, from then on, the read signals S50a and S50b of the adjoining tracks $A_{2n+1}$ (n=1, 2 . . . ) and $B_{2n+1}$ (n=1, 2 . . . ) are simultaneously output to the change-over switches 100a and 100b at a ½ field of time and the read signals S52a and S52b of the adjoining tracks $A_{2n}$ (n=2, 3 . . . ) and $B_{2n}$ (n=2, 3 . . . ) are simultaneously output to the change-over switches 100a and 100b at the next ½ field of time.

When the read signals S50a and S52a of the track A are input at the timings shown in FIG. 8 to the change-over switch 100a, the switch is switched every ½ field of time and the read signal S100a shown in FIG. 8 is output to the reproduced RF amplifier 101b.

In the same way, when the read signals S50b and S52b of the track B are input at the timings shown in FIG. 8 to the change-over switch 100b, the switch is switched every ½ field of time and the read signal S100b shown in FIG. 8 is output to the reproduced RF amplifier 101b.

At the reproduced RF amplifiers 101a and 100b, the read signals S100a and S100b are amplified and the results output as the read signals S101a and S101b to the demodulation circuits 102a and 102b. The read signals S101a and S101b are demodulated at the demodulation circuits 102a and 102b and are output as the read signals S102a and S102b to the change-over switches 103a and 103b.

At the change-over switch 103a, the input read signal S102a is output switched to the memories 104a1 and 104a2 and stored in the memories 104a1 and 104a2. Specifically, as shown in FIG. 8, the read signal S103a1 of the track A1 is stored in the memory 104a1 and then the read signal S103a2 of the track A2 is stored in the memory 104a2 after the elapse of two fields of time. Further, the read signal S103b1 of the track B1 is stored in the memory 104b1 and then the read signal S103b2 of the track B2 is stored in the memory 104b2 after the elapse of two fields of time.

The read signals stored in the memories 104a1 and 104a2 are output to the change-over switch 105a as the read signal S105a as shown in FIG. 8 by the switching in the change-over switch 105a every one field of time.

The read signals stored in the memories 104b1 and 104b2 are output to the change-over switch 105b as the read signals S105b shown in FIG. 8 by the switching in the change-over switch 105b every one field of time.

The read signals S105a and S105b are output to the monitor 8 shown in FIG. 2 as the read signal S6 shown in FIG. 8 by the switching at the change-over switch 106.

In the VTR of this embodiment, when performing n-× speed (n>1) playback, the rotational speed of the upper drum section becomes 30×n/2 (rps).

Further, even at an n-× speed other than a whole multiple speed such as 1× speed, 2× speed, or 4× speed, that is, for example, 1.5× speed, by setting the drum rotational speed to 30×n/2 (rps) in accordance with the tape transport speed, all tracks can be suitably scanned for playback.

Further, in the above example, illustration was made of the case of playing back from a VTR tape, but the method of scanning in the VTR is the same even in the case of recording on a VTR tape. The above-mentioned heads 50a, 50b, 52a, and 52b record the data on the VTR tape in accordance with the above-mentioned scan.

An explanation will now be made of a second embodiment.

In this embodiment, an explanation is made of a VTR for playing back from a VTR tape by transporting the tape in the forward direction at a speed lower than 1× speed.

As shown in the first embodiment explained above, even when playing back a VTR tape at a speed lower than 1× speed, all the tracks of the VTR tape can be suitably scanned if the rotational speed of the upper drum section is made 30×n/2 (rps).

However, if the rotational speed of the upper drum section falls and the frequency handled becomes too low, problems arise in the frequency characteristics of the circuits, so in the VTR of the present embodiment, when playing back from a VTR tape at a speed lower than 1× speed, the rotational speed of the upper drum section is kept from falling below a predetermined rotational speed and the data read by the heads 50a, 50b, 52a, and 52b are rearranged as explained later so as to produce suitable data corresponding to the tracks.

Figure 9:
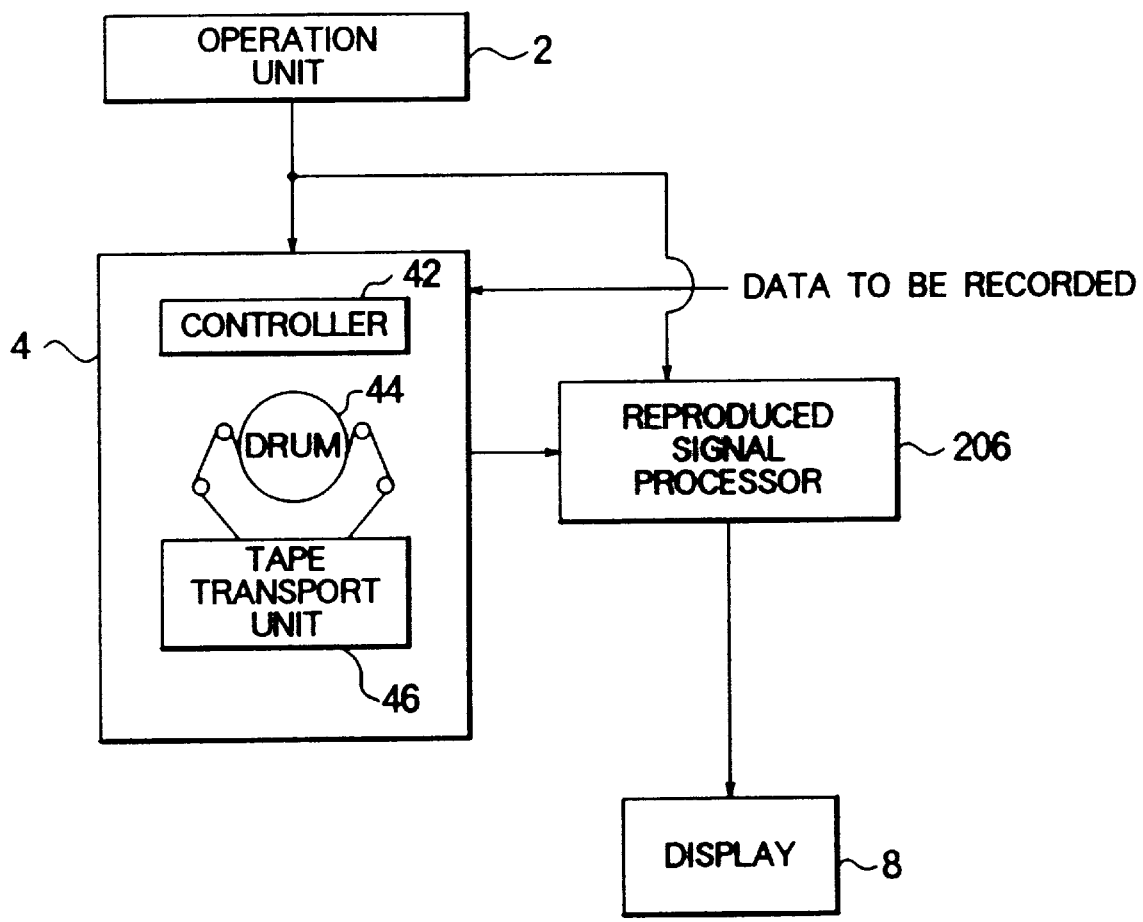
FIG. 9 is a view of the configuration of a VTR of a second embodiment.

FIG. 9 is a view of the configuration of the VTR of this embodiment.

As shown in FIG. 9, the VTR of this embodiment is basically the same as the VTR of the first embodiment shown in FIG. 2. That is, the read signal S4 from the tape transport mechanism 4 is output to the reproduced signal processing unit 206, and the read signal S4 is converted in the reproduced signal processing unit 206 and output as the display signal S206 to the monitor 8.

Illustration will now be made of the case of playing back from a VTR tape at 0.5× speed.

If an operating signal S2 showing a 0.5× speed playback is output to the tape transport mechanism 4 in accordance with operation of the operation panel 2 by the user, a control signal is output from the controller 42 to the drum 44 and the tape transport unit 46.

Based on the control signal, the upper drum section of the drum 44 rotates at a rotational speed of 15 rps and the tape transport unit 46 transports the tape in the forward direction at 0.5× speed.

In this way, in the VTR of this embodiment, when playing back at 0.5× speed, the rotational speed of the upper drum section is made 15 rps and not 30×0.5/2=7.5 rps.

Figure 10A:
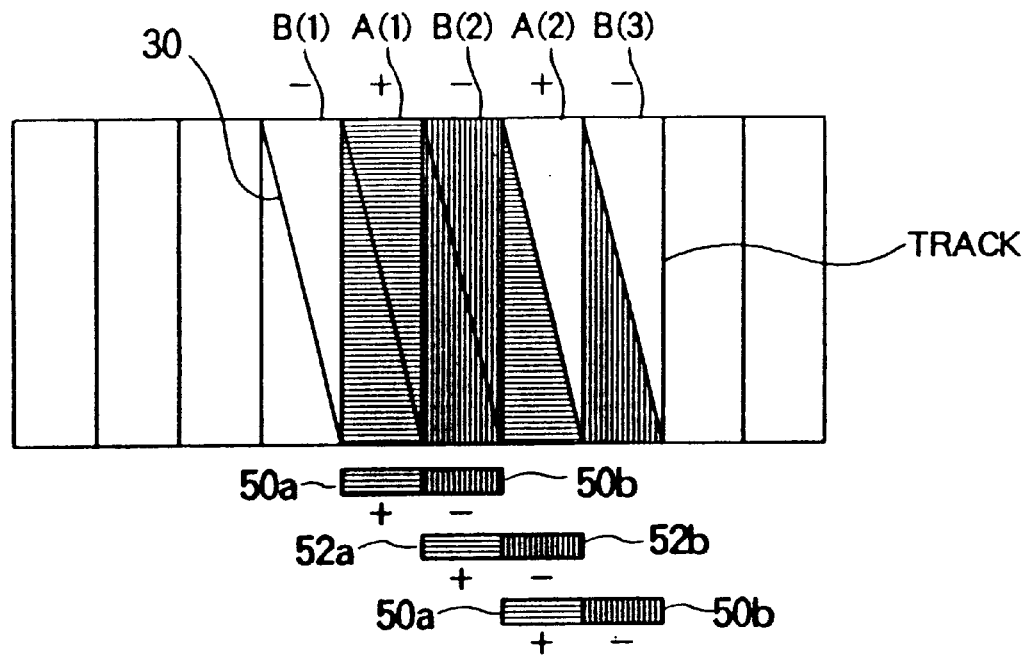
Figure 10B:
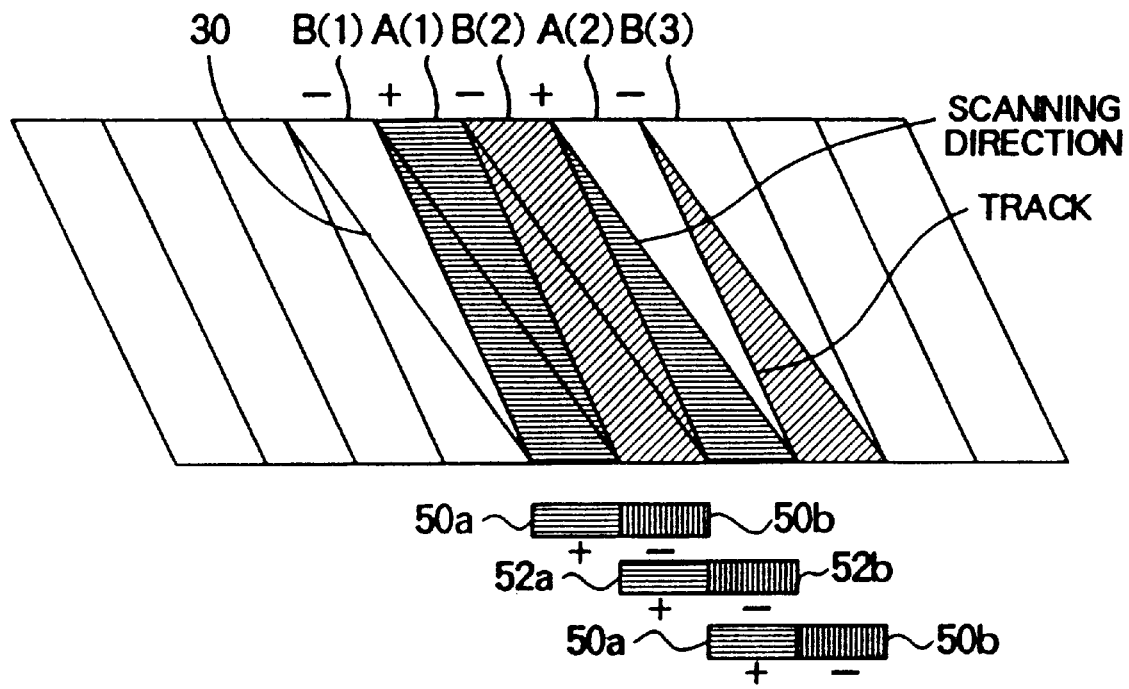

FIGS. 10A and 10B are views for explaining the scanning region of heads of the VTR of the second embodiment, wherein FIG. 10A is a view showing the tracks drawn perpendicular with respect to the transport direction of the tape for simplification and FIG. 10B is a view showing the tracks drawn inclined with a certain angle with respect to the transport direction of the tape close to the actual format. FIGS. 10A and 10B are substantially the same.

The heads 50a, 50b, 52a, and 52b of the upper drum section 44a shown in FIGS. 3A and 3B scan the VTR tape along the path 30 of FIGS. 10A and 10B, that is, do not scan along the tracks.

Further, for example, as shown in FIGS. 10A and 10B, in accordance with the rotation of the upper drum section 44a, the head 50a scans the upper half region of the track B(1) and the lower half region of the track A(1) and the head 50b scans the upper half region of the track A(1) and the lower half region of the track B(2) the first time. By this scan, the lower half region of the track A(1) scanned by the head 50a and the lower half region of B(2) scanned by the head 50b, which scan portions corresponding to the azimuth, are read.

The head 52a scans the upper half region of the track A(1) and the lower half region of the track B(2) and the head 52b scans the upper half region of the track B(2) and the lower half region of the track A(2) the second time. By this scan, the upper half region of the track A(1) scanned by the head 52a and the upper half region of B(2) scanned by the head 52b, which scan portions corresponding to the azimuth, are read.

The head 50a scans the upper half region of the track B(2) and the lower half region of the track (2) and the head 50b scans the upper half region of the track A(2) and the lower half region of the track B(3) the third time. By this scan, the upper half region of the track A(2) scanned by the head 50a and the lower half region of B(3) scanned by the head 50b, which scan portions corresponding to the azimuth, are read.

In this way, all the regions of the tracks A(1) and B(2) are read by the heads 50a, 50b, 52a, and 52b by the three scans.

However, the lower half region of the track A(1) is read by the head 50a the first time, and the upper half region of the track A(1) is read by the head 52a the second time.

Further, the lower half region of the track B(2) is read by the head 50b the first time, and the upper half region of the track B(2) is read by the head 52b the second time.

Accordingly, it is necessary to process the results of reading of the heads and produce the read data corresponding to the tracks.

In the VTR of this embodiment, the signals read by the heads 50a, 50b, 52a, and 52b are processed as follows in the reproduced signal processing unit 206.

First, an explanation will be given of the configuration of the reproduced signal processing unit 206.

Figure 11:
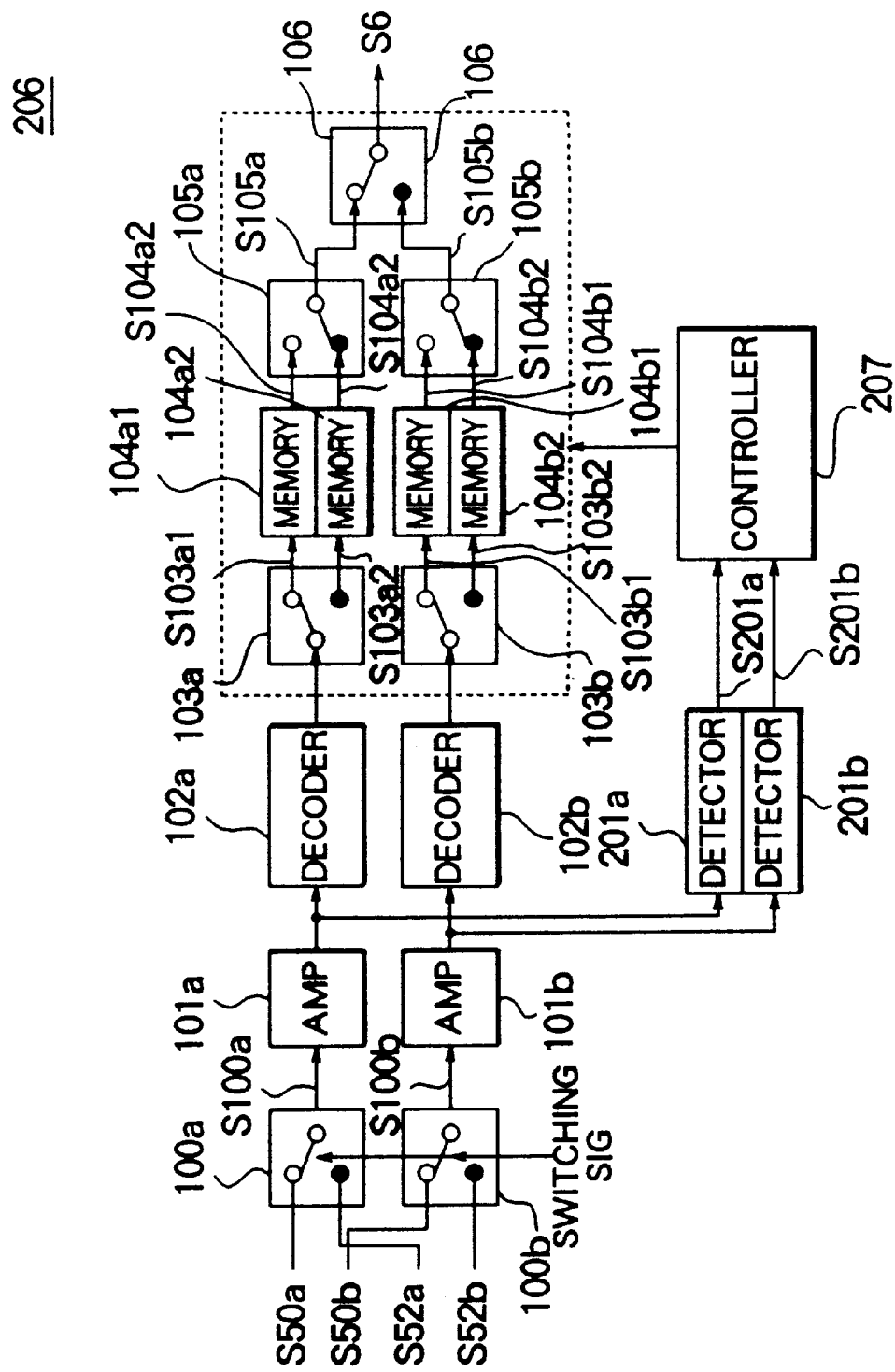
FIG. 11 is a view of the configuration of the reproduced signal processing unit in the second embodiment.

FIG. 11 is a view of the configuration of a reproduced signal processing unit 206.

As shown in FIG. 11, the reproduced signal processing unit 206 is comprised of the reproduced signal processing unit 6 shown in FIG. 5 plus the RF envelope detectors 201a and 201b.

The RF envelope detectors 201a and 201b receive as input the read signals from the reproduced RF amplifiers 101a and 101b, perform envelope detection, and output the signals S201a and S201b detected in accordance with the detection to the control circuit 207.

The control circuit 207 receives as input the detected signals S201a and S201b from the RF envelope detectors 201a and 201b, outputs the change-over signals S207 produced based on these detected signals, and controls the switching of the change-over switches 103a, 103b, 105a, 105b, and 106.

The processing in the reproduced signal processing unit 206 will be explained now in detail referring to the timing of processing shown in FIG. 12.

Figure 12:
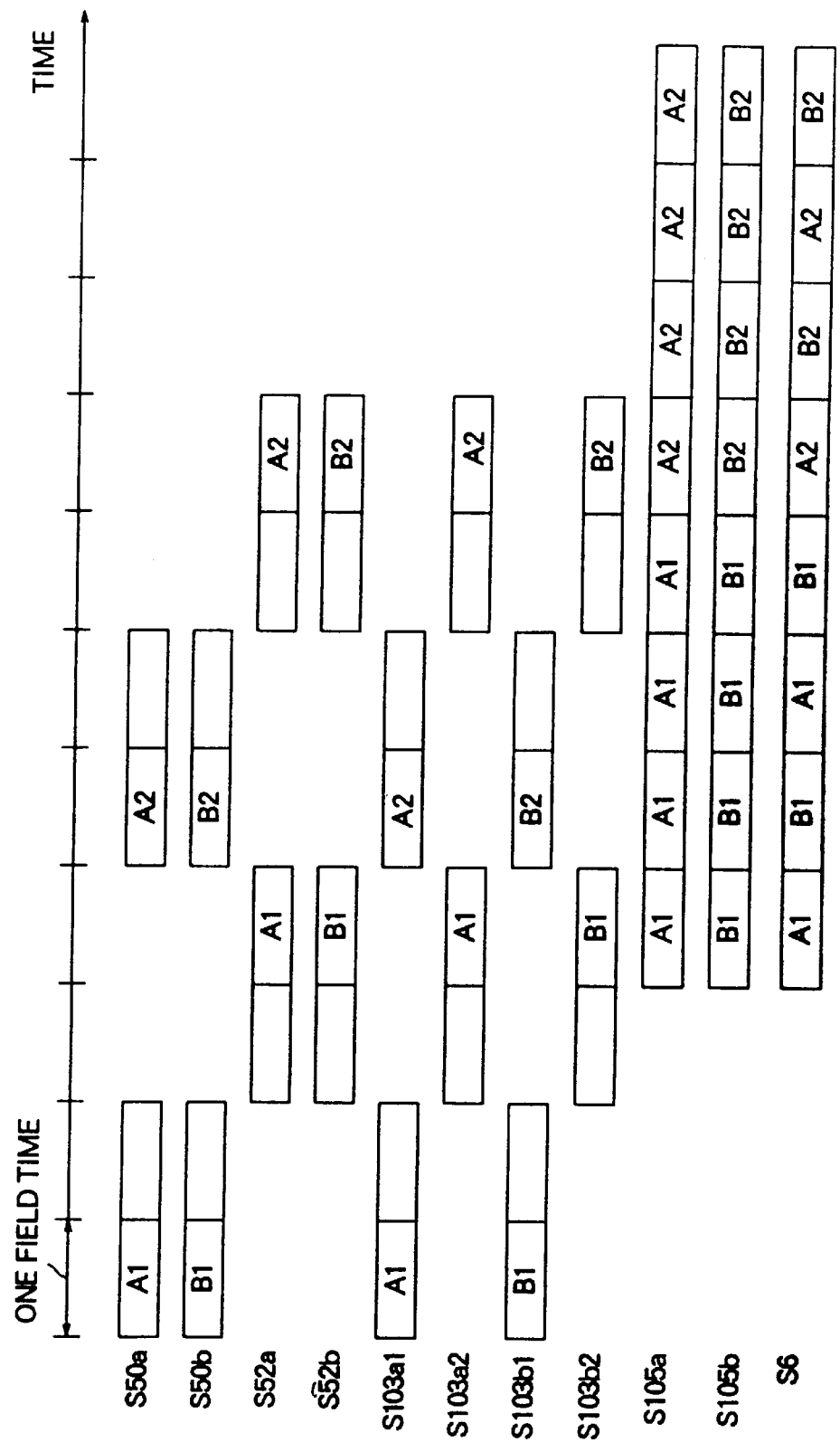
FIG. 12 is a timing chart of the processing of the reproduced signal processing unit in the second embodiment.

The signals S50a, S50b, S52a, and S52b read from the heads 50a, 50b, 52a, and 52b are output to the change-over switches 100a and 100b at the timings shown in FIG. 12.

That is, as shown in FIG. 12, in the first two fields of time, the signal S50a of the first half of the track A1 read by the head 50a is output to the change-over switch 100a and, at the same time, the signal S50b of the first half of the track B1 read by the head 50b is output to the change-over switch 100b.

In the next two fields of time, the signal S52a of the second half of the track A1 read by the head 52a is output to the change-over switch 100a and the signal S52b of the second half of the track B1 read by the head 52b is output to the change-over switch 100b.

Similarly, from then on, the read signals S50a and S50b of the first and second halves of the tracks A2 . . . are output to the change-over switch 100a. Further, the read signals S52a and S52b of the first and second halves of the tracks B2 . . . are output to the change-over switch 100b.

When the read signals S50a and S52a of the first and second halves of the track A are input to the change-over switch 100a at the timing shown in the above FIG. 12, the switch is operated at the predetermined timing and the read signals S100a are output and stored through the demodulation circuit 102a and change-over switch 103a as the read signals S103a1 and S103a2 shown in FIG. 12 in the memories 104a1 and 104a2. That is, the read signal S50a at the first half of the track A1 is stored in the memory 104a1 and the read signal S52a of the second half of the track A1 is stored in the memory 104b2.

Similarly, when the read signals S50b and S52b of the first and second halves of the track B are input to the change-over switch 100b at the timing shown in the above FIG. 12, the switch is operated at the predetermined timing and the read signal S100b is output and stored through the demodulation circuit 102b and change-over switch 103b as the read signals S103b1 and S103b2 shown in FIG. 12 in the memories 104b1 and 104b2. That is, the read signal S50b at the first half of the track B1 is stored in the memory 104b1 and the read signal S52b of the second half of the track B1 is stored in the memory 104b2.

The read signals stored at the memories 104a1 and 104a2 are output to the change-over switch 106 as the read signal S105a shown in FIG. 12 by the switching at the change-over switch 105a.

The read signals stored at the memories 104b1 and 104b2 are output to the change-over switch 106 as the read signal S105b shown in FIG. 12 by the switching at the change-over switch 105b.

The read signals S105a and S105b are output to the monitor 8 shown in FIG. 2 as the read signal S6 shown in FIG. 12 by the switching at the change-over switch 106.

Further, the display signal S6 is output from the reproduced signal processing unit 206 to the monitor 8, where an image corresponding to the display signal S6 is shown on a display of the monitor 8.

As explained above, according to the VTR of this embodiment, it is possible to make the rotational speed of the upper drum section 15 rps even when performing 0.5× speed playback, the frequencies handled by the tape transport mechanism 4, the the reproduced signal processing unit 206, and other circuits do not become that high, and therefore the fabrication of the circuits becomes relatively simple.

Further, the read data by the heads is suitably converted in accordance with the tracks by the processing at the reproduced signal processing unit 206.

As explained above, in 0.5× speed playback, if the rotational speed of the drum is made ½ of the normal speed, the drum rotates by a half in two fields of time (twice the normal time). Further, the head 50a and head 52a trace one track every half rotation and the heads 50b and head 52b trace one track every half rotation. At this time, the head 50a and the head 50b can read the first half of the track and the head 52a and head 52b the second half of the track with good S/N characteristics.

Accordingly, by storing the demodulated signals in the memories and reading with a large RF level and good S/N ratio when reading out, it is possible to take out clean signals. Further, since the demodulated signals have a ½ frequency (double the time axis), the time axis is restored to normal by reading out at double the frequency. By performing the above operation for each of the track A and track B sides and reading out from each side two times, 0.5× speed playback also becomes possible.

An explanation will now be made of a third embodiment.

In this embodiment, an explanation is made of a VTR for playing back by transporting the VTR tape in the reverse direction.

The configuration of the VTR of this embodiment is the same as the VTR shown in FIG. 9 of the second embodiment explained above.

Below, an explanation will be made of −1× speed playback using the VTR of this embodiment, wherein the VTR tape is transported at 1× speed in the reverse direction for scanning and playback.

In the VTR of this embodiment as well, like with the case of the second embodiment described above, the read signal S4 from the tape transport mechanism 4 is output to the reproduced signal processing unit 206. The read signal S4 is converted by the reproduced signal processing unit 206 and then output to the monitor 8 as the display signal S206. An image based on the display signals S206 is shown on the display of the monitor 8.

The tape transport unit 46 shown in FIG. 9 transports the VTR tape at 1× speed in the reverse direction based on the control signal from the controller 42 which in turn corresponds to the operating signal S2 from the operation panel 2.

At this time, it is necessary to set the rotational speed of the upper drum section 44a shown in FIGS. 3A and 3B so that read data corresponding to all the tracks is obtained in the reproduced signal processing unit 206 of FIG. 9 based on the read data of the heads 50a, 50b, 52a, and 52b.

For this, it is necessary to select the rotational speed of the upper drum section 44a so that all plus azimuth tracks can be scanned by the heads 50a and 52a and all minus azimuth tracks can be scanned by the heads 50b and 52b.

Here, illustration will be given of the case where the rotational speed of the upper drum section 44a was not suitably selected.

Figure 13A:
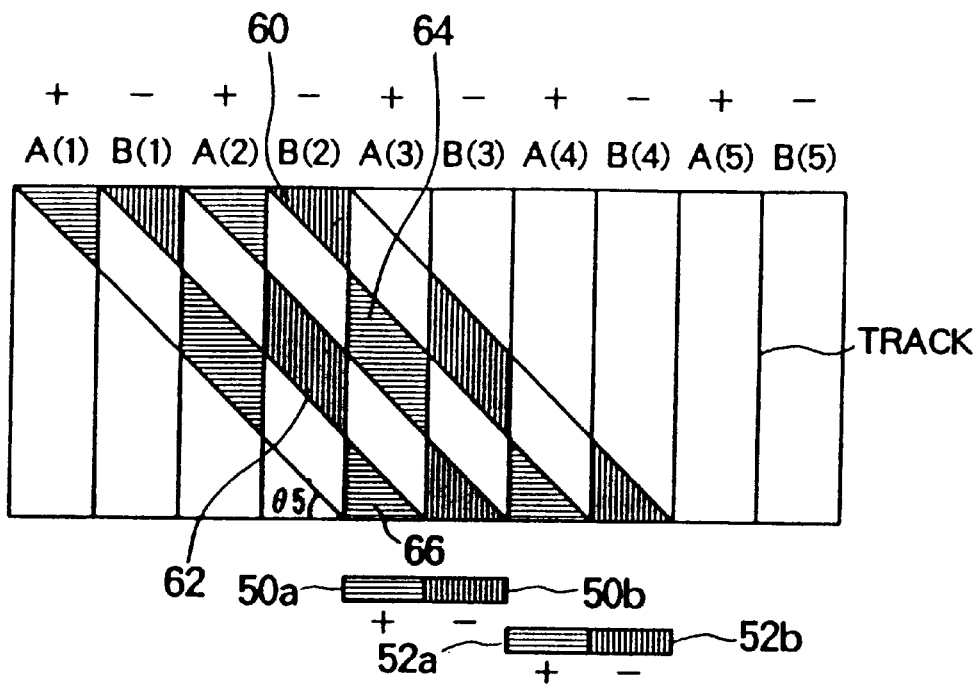
Figure 13B:
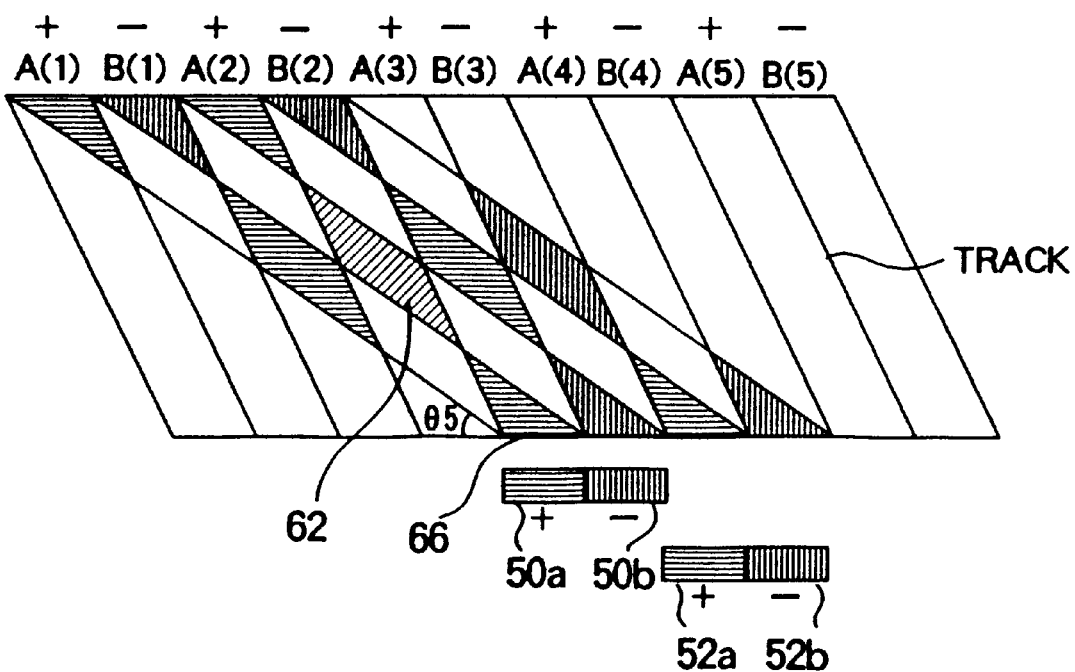

FIGS. 13A and 13B are views for explaining the scanning region of heads of the VTR of the second embodiment in the case of selection of 15 rps as the rotational speed of the drum, wherein FIG. 13A is a view showing the tracks drawn perpendicular with respect to the transport direction of the tape for simplification and FIG. 13B is a view showing the tracks drawn inclined with a certain angle with respect to the transport direction of the tape close to the actual format. FIGS. 13A and 13B are substantially the same.

When for example 15 rps is selected as the rotational speed of the upper drum section 44a, as shown in FIG. 13A, if the VTR tape is transported at −1× speed, the scanning angle of the heads 50a, 50b, 52a, and 52b become θ5.

At this time, for example, in the track A(3), the region 64 is scanned by the head 52a and the region 66 is scanned by the head 50a, but other regions are not scanned by the heads 50a and 52a and so are not read.

Further, in the track B(2), the region 60 is scanned by the head 52b and the region 62 is scanned by the head 50b, but other regions are not scanned by the heads 50b and 52b and so are not read.

Accordingly, with the rotational speed of the upper drum section 44a made 15 rps, it is not possible to read all the regions of the tracks of the VTR tape.

According, in the VTR of this embodiment, 30 rps is selected as the rotational speed of the upper drum section 44a.

Figure 14A:
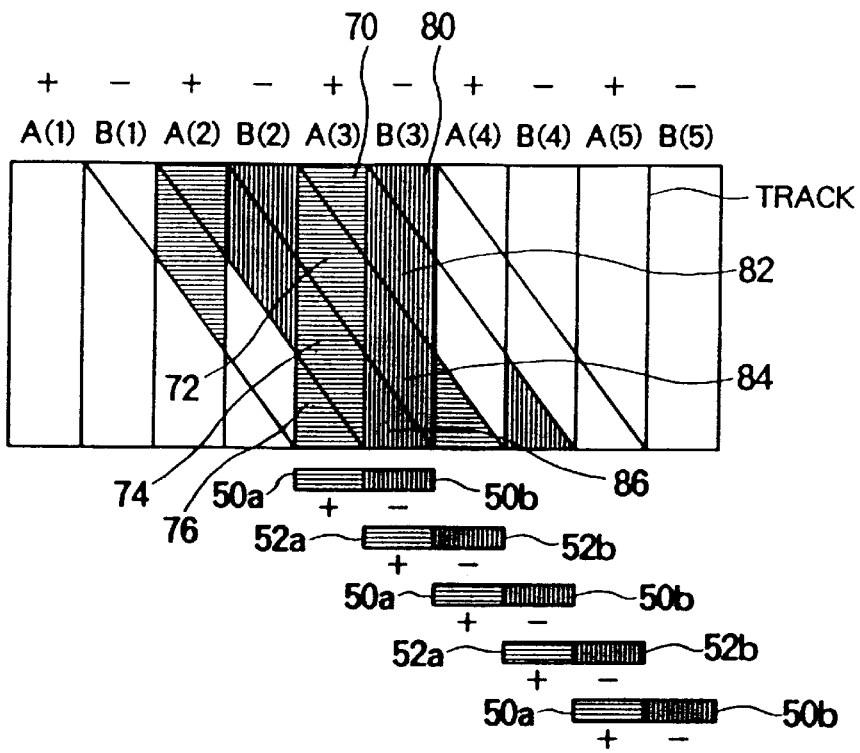
Figure 14B:
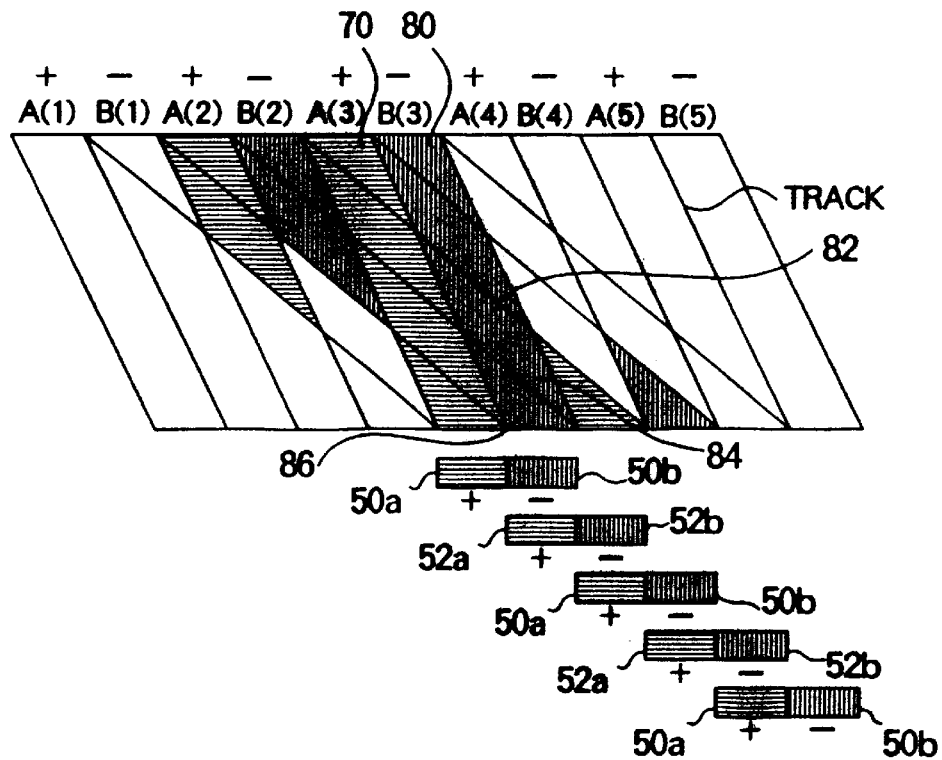

FIGS. 14A and 14B are views for explaining the scanning region of heads of the VTR of the embodiment in the case of selection of 35 rps as the rotational speed of the drum, wherein FIG. 14A is a view showing the tracks drawn perpendicular with respect to the transport direction of the tape for simplification and FIG. 14B is a view showing the tracks drawn inclined with a certain angle with respect to the transport direction of the tape close to the actual format. FIGS. 13A and 13B are substantially the same.

In the VTR of this embodiment, the region 76 of the track A(3) is scanned by the head 50a the first time, the region 74 is scanned by the head 52a the second time, the region 72 is scanned by the head 50a the third time, and the region 70 is scanned by the head 50a the fourth time.

In this way, all regions of the track A(3) are scanned by the heads 50a and 52a.

Further, the region 86 of the track B(3) is scanned by the head 50b the first time, the region 84 is scanned by the head 52b the second time, the region 82 is scanned by the head 50b the third time, and the region 80 is scanned by the head 50b the fourth time.

In this way, all regions of the track B(3) are scanned by the heads 50b and 52b.

Accordingly, by making the rotational speed of the upper drum section 44 30 rps, it is possible to read all of the regions of the tracks of the VTR tape.

In the case shown by the above-mentioned FIG. 14B, the reproduced signal processing unit 206 rearranges for example the region 76 read the first time, the region 74 read the second time, the region 72 read the third time, and the region 70 read the fourth time so as to produce the read data of the track A(3).

Further, the reproduced signal processing unit 206 rearranges the region 86 read the first time, the region 84 read the second time, the region 82 read the third time, and the region 80 read the fourth time to produce the read data of the track B(3).

In the above-mentioned example, illustration was made of −1× speed playback, but it is possible to perform suitable playback in the reverse direction at other than a −1× speed as well by, for example, setting the rotational speed of the upper drum section to 15 rps and suitably rearranging the read data in the reproduced signal processing unit 206.

Figure 15:
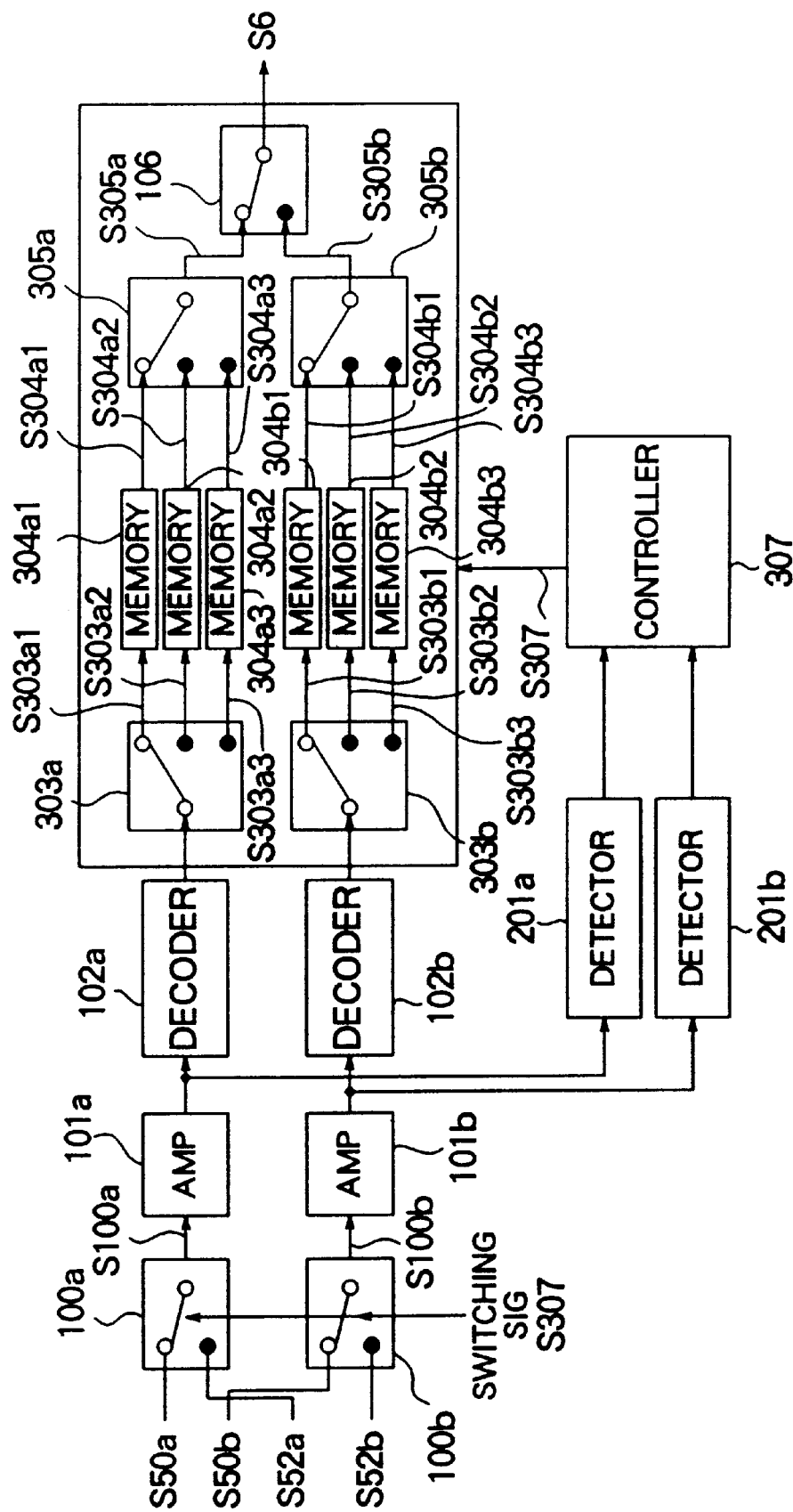
FIG. 15 is a view of the configuration of the reproduced signal processing unit in a third embodiment.

The reproduced signal processing unit 206 shown in FIG. 9 in this embodiment has the configuration shown in FIG. 15.

As shown in FIG. 15, the reproduced signal processing unit 206 uses the change-over switches 303a, 303b, 305a, and 305b instead of the change-over switches 103a, 103b, 105a, and 105b shown in FIG. 11 and uses the memories 304a1, 304a2, 304a3, 304b1, 304b2, and 304b3 instead of the memories 104a1, 104a2, 104b1, and 104b2. The rest of the configuration of the reproduced signal processing unit 206 of the embodiment shown in FIG. 14 is the same as the reproduced signal processing unit 206 of the second embodiment shown in FIG. 11.

An explanation will be given now of the processing by the reproduced signal processing unit 206 shown in FIG. 15 at the time of playback in the reverse direction while referring to the timing shown in FIG. 16.

Figure 16:
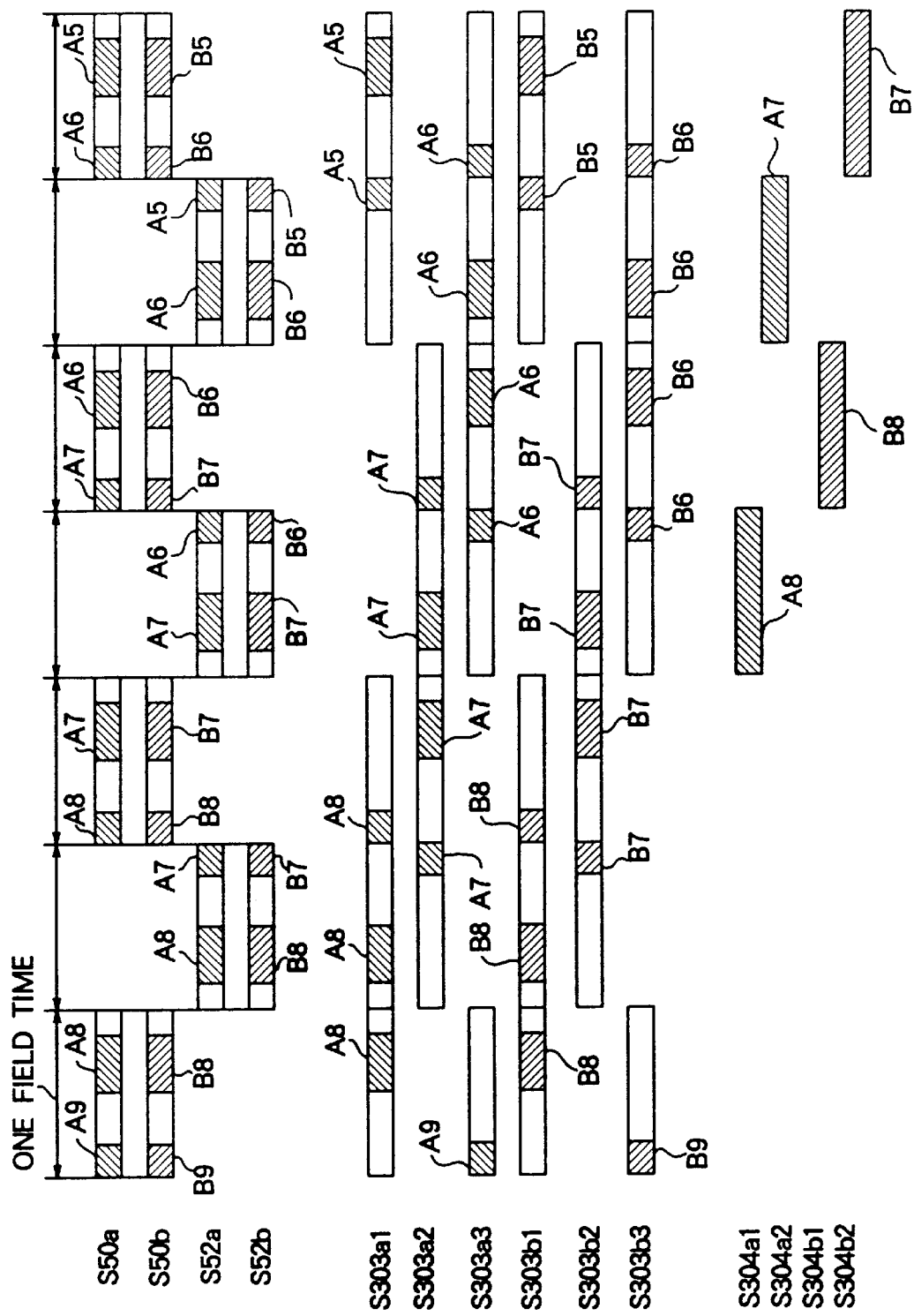
FIG. 16 is a timing chart of the processing of the reproduced signal processing unit in the third embodiment.

The read signals S50a, S50b, S52a, and S52b from the heads 50a, 50b, 52a, and 52b are output to the change-over switches 100a and 100b at the timings shown in FIG. 16.

That is, as shown in FIG. 16, at the time of the first field, the signals S50a of the tracks A9 and A8 read by the head 50a are output to the change-over switch 100a, while the signals S50b of the tracks B9 and B8 read by the head 50b are output to the change-over switch 100b.

Next, at the time of the second field, the signal S52a of the tracks A8 and A7 read by the head 50a is output to the change-over switch 100a, while the signal S52b of the tracks B8 and B7 read by the head 52b is output to the change-over switch 100b.

The signals of the other adjoining tracks A and B are similarly output to the change-over switches 100a and 100b in the same way.

When the read signals S50a and S52a of track A are input to the change-over switch 100a at the timing shown by FIG. 16, the read signal S100a is stored by the operation of the switch through the reproduced RF amplifier 101a, demodulation circuit 102a, and change-over switch 303a as the read signals S303a1, S303a2, and S303a3 in the memories 304a1, 304a2, and 304a3. That is, the read signals S50a and S52a of the tracks A8 and A5 are stored in the memory 304a1. The read signals S50a and S52a of the track A7 are stored in the memory 304a2. The read signals S50a and S52a of the tracks A9 and A6 are stored in the memory 304a3.

Similarly, when the read signals S50b and S52b of the track B are input to the change-over switch 100b at the timing shown by FIG. 16, the read signal S100b is stored by the operation of the switch through the reproduced RF amplifier 101b, demodulation circuit 102b, and change-over switch 303b as the read signals S303b1, S303b2, and S303b3 in the memories 304b1, 304b2, and 304b3. That is, the read signals S50b and S52b of the tracks B8 and B5 are stored in the memory 304b1. The read signals S50b and S52b of the track B7 are stored in the memory 304b2. The read signals S50b and S52b of the tracks B9 and B6 are stored in the memory 304b3.

The read signals stored in the memories 304a1 and 304a2 are output to the change-over switch 305a as the read signals S304a1 and S304a2 as shown in FIG. 16 by the switching in the change-over switch 305a.

The read signals stored in the memories 304b1 and 304b2 are output to the change-over switch 305b as the read signals S304b1 and S304b2 as shown in FIG. 16 by the switching in the change-over switch 305b.

The read signals S305a and S305b from the change-over switches 305a and 305b are output to the display monitor 8 shown in FIG. 2 as a continuous signal, that is, the read signal S6, by the switching by the change-over switch 106.

The display signal S6 is output from the reproduced signal processing unit 6 to the monitor 8 and an image based on the display signal S6 is shown on the display of the monitor 8.

As explained above, according to the VTR of this embodiment, it is possible to suitably play back in the reverse direction as well.

An explanation will next be made of a fourth embodiment.

In this embodiment, an explanation will be made of a VTR which, when during playback of the VTR tape, reads the same region of the VTR tape two times by a head and selects and plays back the read data with the least reading error among these read data.

Figure 17:
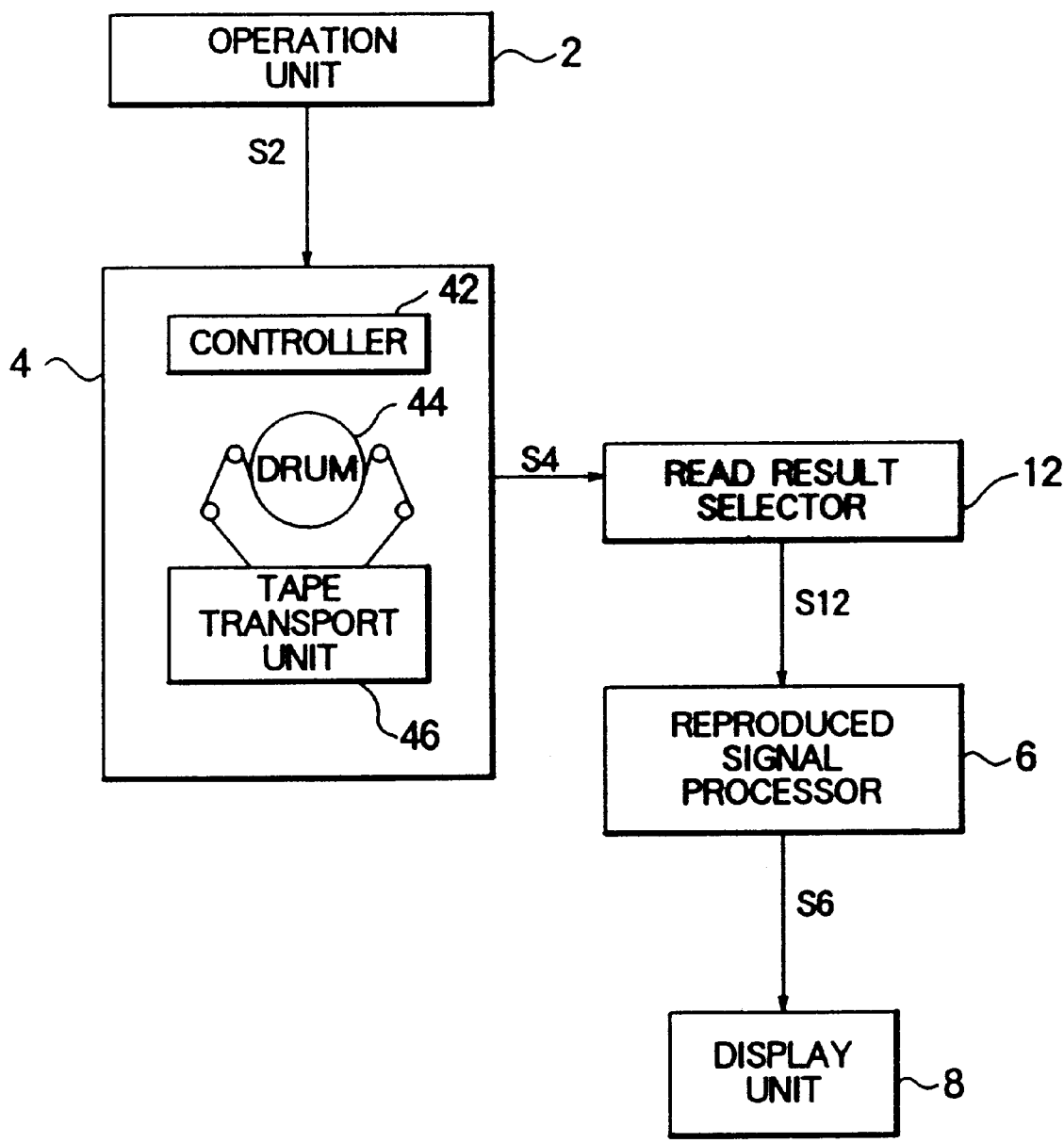
FIG. 17 is a view of the configuration of a VTR of a fourth embodiment.

FIG. 17 is a view of the configuration of a VTR of this embodiment.

As shown in FIG. 17, the VTR of this embodiment is constructed so that the read data S4 from the tape transport mechanism 4 is output to the read data selection unit 12, the read data with the least error is selected from among the number of read data relating to the same region of the VTR tape by the read data selection unit 12, and the selected data S12 is output to the reproduced signal processing unit 6.

Here, the 1× speed playback will be explained as an example.

The tape transport unit 46 transports the VTR tape at 1× speed in the forward direction based on a control signal from the controller 42.

The upper drum section of the drum 44 rotates at a rotational speed so that all the tracks of the VTR tape are scanned two times by the corresponding azimuth heads based on the control signal from the controller 42 when the VTR tape is transported at 1× speed. The upper drum section rotates at 30 rps for example.

Figure 18A:
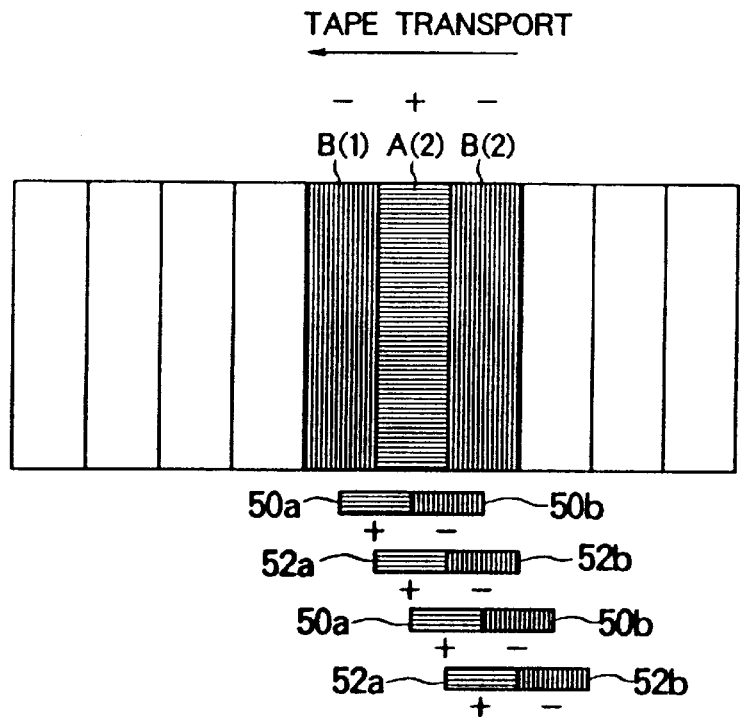
Figure 18B:
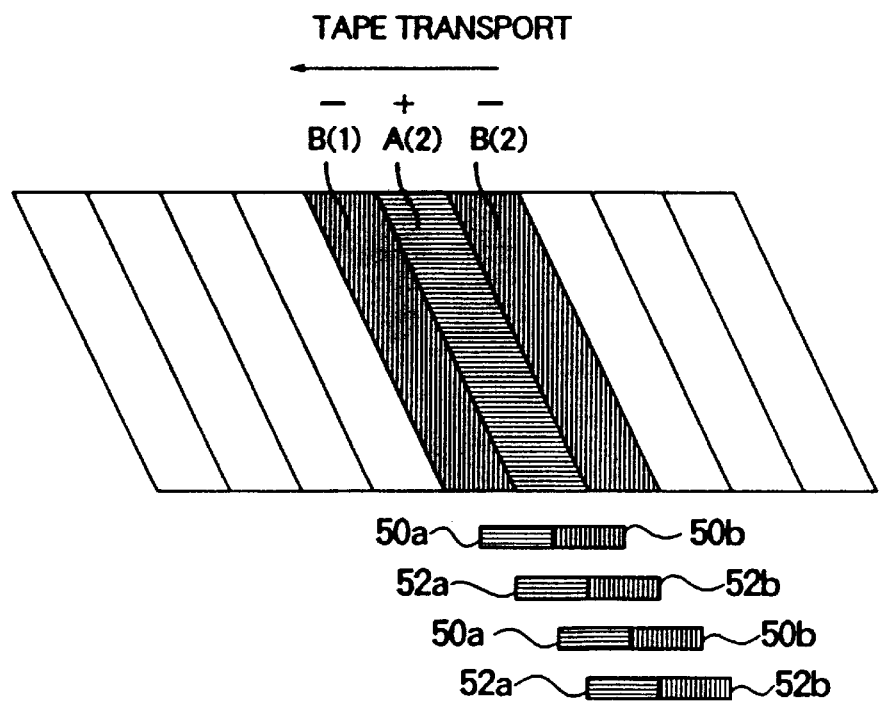

FIGS. 18A and 18B are views for explaining the scanning region of heads of the VTR shown in FIG. 17, wherein FIG. 18A is a view showing the tracks drawn perpendicular with respect to the transport direction of the tape for simplification and FIG. 18B is a view showing the tracks drawn inclined with a certain angle with respect to the transport direction of the tape close to the actual format. FIGS. 18A and 18B are substantially the same, As shown in FIGS. 18A and 18B, the plus azimuth track A(2) has its left half region scanned by the plus azimuth head 50a the first time, has the entire region scanned by the plus azimuth head 52 the second time, and has the right half region scanned by the head 50a the third time.

Accordingly, the entire region of the track A(2) is read two times, the first and third times and the second time. The results of the reading operation are compared by the read data selection unit 12.

At the read data selection unit 12, the read data with less error is selected, and the selected data S12 is output to the reproduced signal processing unit 6, where the display signal is produced.

As explained above, according to the VTR of this embodiment, the same region of the VTR tape is read two times, so it is possible to drastically reduce the probability of inability of playback due to randomly occurring reading errors such as in the case where signals are accurately recorded on the VTR tape, but accurate reading is not possible due to dust etc.

An explanation will now be made of a fifth embodiment.

In this embodiment, explanation is made of a VTR which performs the tracking servo control using as the AFT information the pilot signals which are recorded on the VTR tape so as to be able to correct errors in head height caused by vibration of the drum face.

Figure 19:
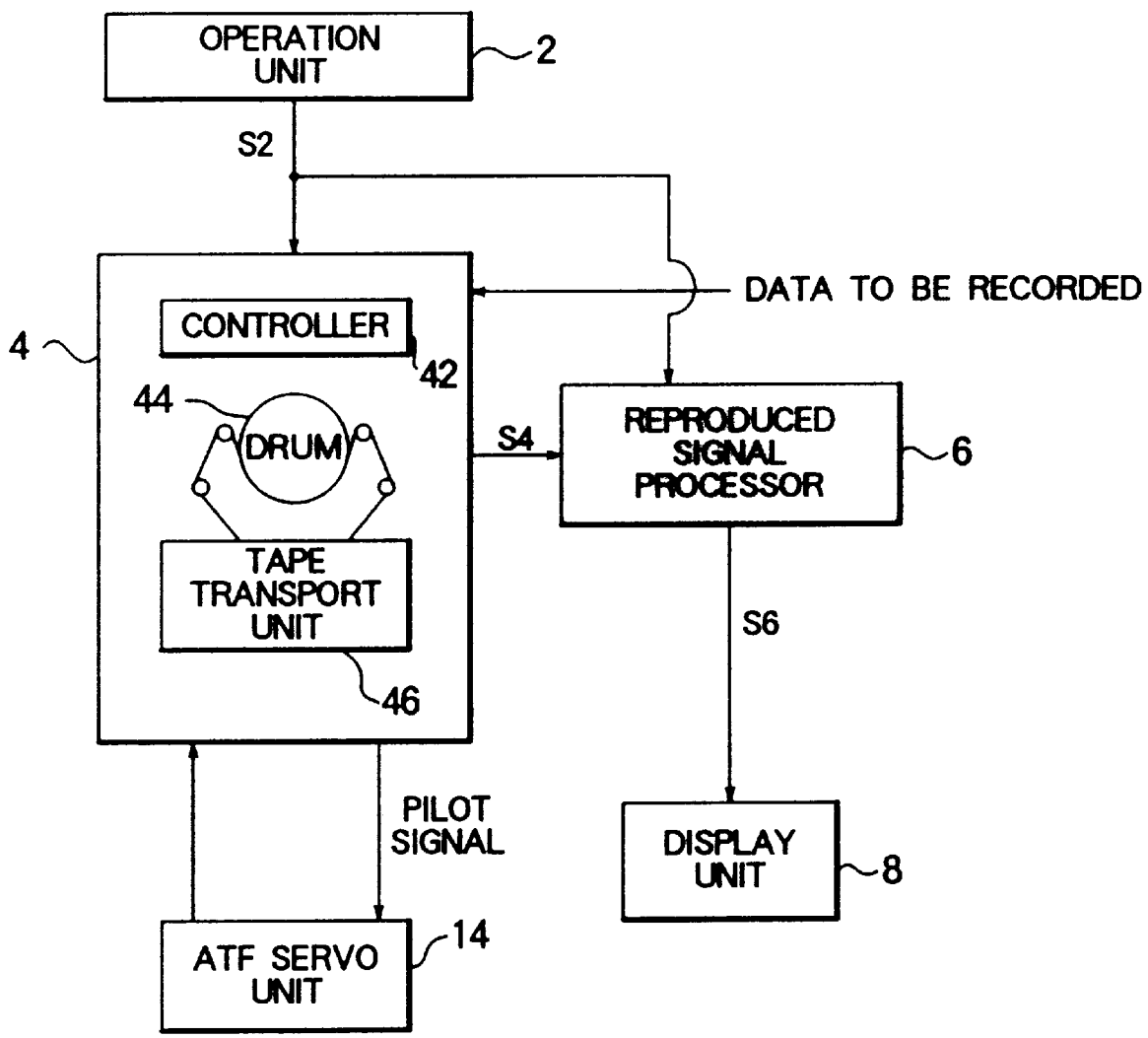
FIG. 19 is a view of the configuration of a VTR of a fifth embodiment.

FIG. 19 is a view of the configuration of the VTR of the present embodiment and shows a configuration of the VTR of the first embodiment shown in FIG. 2 plus an ATF servo unit 14.

On the VTR tape used for the VTR of the embodiment, as shown in FIG. 2, pilot signals having a frequency characteristic of f0 are recorded on the even number tracks for example, while pilot signals having frequency characteristics of f1 and f2 are recorded alternately on the odd number tracks.

In the VTR of this embodiment, the heads 50a and 52a shown in FIG. 3B scan the even number tracks, while the heads 50b and 52b scan the odd number tracks. As explained with reference to the related art, the tracking servo control works only for the even number tracks which the heads 50a and 52a scan.

However, in the VTR of this embodiment, as explained with reference to the first embodiment, by controlling by tracking servo control the even number tracks which the head 50a scans so that the head 50a and the head 52a scan adjoining tracks simultaneously, even the odd number tracks which the head 50b scans can be suitably scanned.

At this time, it is necessary that the head 50a and the head 50b be placed relatively positioned in advance with a high precision.

As shown in FIG. 19, in the VTR of this embodiment, the pilot signals of the even numbered tracks read by the heads 50a and 50b are output to the ATF servo unit 14, the ratio of the f1 and f2 included in the pilot signals is detected, and the scanning positions of the heads 50a and 50b are corrected by tracking servo control in accordance with the results of detection.

In the case shown in FIG. 4, for example, in the case of a large ratio of the frequency f1 included in the read pilot signals, the heads 50a and 52a lean too much in the direction of the track recording the f1 pilot signals, so the heads 50a and 52a are moved by the distances in accordance with the ratio in the direction of the track recording the f2 pilot signals.

As explained above, in the VTR of the embodiment, by suitably setting the relative positions between the heads 50a and 52a and the heads 50b and 52b, the heads 50a and 52a and the heads 50b and 52b simultaneously scan the adjoining tracks, so by performing tracking servo control on the tracks scanned by the heads 50a and 52a, it is possible to suitably scan even the tracks scanned by the heads 50b and 52b.

In the above embodiments, a VTR was shown as an example, but the signal reproducing apparatus of the present invention may also be a VHS tape scanning apparatus for scanning VHS tapes. In this case, the angle of the lead of the upper drum section 44a in FIG. 3A is for example 5°54'4.9".

The signal reproducing apparatus of the present invention is not limited to the above-mentioned embodiments.

For example, as shown in FIG. 20, the VTRs 4 and 5 may be connected through the recording signal processing unit 7 and reproduced signal processing unit 6 and perform recording and playback between them based on control signals from the system controller 3 in accordance with operation signals from the operation panel 2. At this time, for example, use may be made of a hard disk or semiconductor memory instead of the VTR 5.

As explained above, according to the signal reproducing apparatus of the present invention, it is possible to halve the rotational speed of the upper drum section from the past and possible to use circuits with frequency characteristics lower than in the past.

As a result, it is possible to realize even 4× speed playback and recording, which had been difficult in the past due to the frequency characteristics of the circuits etc., with circuits having frequency characteristics equivalent to the circuits used in 2× speed playback and recording of the past. Further, it is possible to suppress the influences of hitting of the head tips and thereby reduce head damage and extend head life.

Further, according to the signal reproducing apparatus of the present invention, it is possible to perform slow motion playback and −1× speed playback without use of dynamic tracking heads, which was a factor complicating the construction of the drum.

As a result, the construction of the drum becomes simple and the manufacturing costs become lower.

Further, according to the signal reproducing apparatus of the present invention, it is possible to reduce the possibility of inability of playback due to randomly occurring reading errors caused by dust etc. adhering to the magnetic tape.

Further, according to the signal reproducing apparatus of the present invention, when adopting the technique of performing atf servo or other tracking servo control for every other track, it is possible to scan the tracks with a high precision even in the case of tracks not subjected to tracking servo control by pilot signals or other ATF information.

What is claimed is:

1. An apparatus for reproducing signals from a tape medium having tracks recorded at a track angle according to a helical recording arrangement and transported along a tape-transport direction at a tape speed n·x, wherein x is a tape speed number and n is a real number, such that normal speed playback is indicated by n=1, and wherein adjacent tracks have a longer diagonal defined as a bisector intercepting two corners most distant from each other of said adjacent tracks, said apparatus comprising:

a rotary drum being rotatable about a longitudinal axis about which said tape medium is disposed at a lead angle with respect to said longitudinal axis, wherein during forward playback of said tape said rotary drum rotates at a rotary drum rate of n multiplied by a constant, and wherein the drum rate may not be set below a minimum rate such that when the product of n multiplied by said constant is less than the minimum rate the drum rate is set equal to the minimum rate;

a plurality of non-dynamic tracking rotary heads coupled to said rotary drum for reproducing data from said tracks by scanning said tracks in a scanning direction forming a scanning angle which is an acute angle between said longer diagonal in said scanning direction and said tape-transport direction when the tape medium is in a still-mode;

wherein said lead angle of said rotary drum is such that during playback at a tape speed corresponding to n≧1 said scanning angle equals said track angle and each track is traced by a respective head; and processing means for reconstructing said data into a coherent signal.

2. The apparatus for reproducing signals according to claim 1, further comprising:

tape transport means for regulating a transportation rate of the tape medium and a drum rate of the rotary drum during 1×, 2× and 4× playback speeds such that an effective scanning angle of said heads is changed from said scanning angle in the still-mode to a track angle, said track angle being an angle between the tape-transport direction and a leading edge of a track, wherein, each of said rotary heads scans one complete track.

3. The apparatus for reproducing signals according to claim 2, wherein the processing means comprises:

a memory for storing the data reproduced from the tape medium;

switching means selectively connecting the rotary heads to the memory for causing the memory to store data reproduced from said tracks and for causing the memory to output a coherent signal composed from the data stored in said memory.

4. The apparatus for reproducing signals according to claim 3, wherein the switching means causes the memory to output data reproduced from each consecutive track during the 1× playback speed.

5. The apparatus for reproducing signals according to claim 3, wherein the switching means causes the memory to output data reproduced from every other pair of said tracks during the 2× playback speed.

6. The apparatus for reproducing signals according to claim 3, wherein the switching means causes the memory to output data reproduced from every fourth pair of said tracks during the 4× playback speed.

7. The apparatus for reproducing signals according to claim 1, further comprising:

tape transport means for regulating a transportation rate of the tape medium and a drum rate of the rotary drum during forward playback speeds lower than a 1× playback speed such that an effective scanning angle of said heads is deviated from the scanning angle in the still mode causing said rotary heads to scan different portions of a track, wherein, substantially all portions of said track are scanned.

8. The apparatus for reproducing signals according to claim 7, wherein the processing means comprises:

a memory for storing the data reproduced from the tape medium;

switching means selectively connecting the rotary heads to the memory for causing the memory to store data reproduced from each portion of a respective track and for causing the memory to output a coherent signal composed from the stored data reproduced from said portions of said respective track.

9. The apparatus for reproducing signals according to claim 8, wherein the tape transport means effectively changes the scanning angle of said heads such that each rotary head scans one half of said track during a 0.5× playback speed.

10. The apparatus for reproducing signals according to claim 9, wherein the memory twice outputs the coherent signal composed of the stored data reproduced from said portions of said respective track consecutively.

11. The apparatus for reproducing signals according to claim 8, wherein the processing means further comprises:

RF envelope detection means for detecting a transition when said rotary heads begin scanning a different track, wherein, said switching means selectively connects the rotary heads to the memory when the RF envelope detecting means detects said transition such that the memory stores the data reproduced from said portions of said respective track as a memory unit.

12. The apparatus for reproducing signals according to claim 1, further comprising:

tape transport means for regulating a transportation rate of the tape medium and a drum rate of the rotary drum during reverse playback speeds, wherein, the tape-transport means reverses the tape-transport direction and an effective scanning angle of said heads becomes more acute than the scanning angle in the still-mode, wherein, said rotary heads scan different portions of a track such that substantially all of the portions of said track are scanned.

13. The apparatus for reproducing signals according to claim 12, further comprising:

a memory for storing the data reproduced from the tape medium; and switching means selectively connecting the rotary heads to the memory for causing the memory to store data reproduced from each portion of a respective track and for causing the memory to output a coherent signal composed from the stored data reproduced from said portions of said respective track.

14. The apparatus for reproducing signals according to claim 13, wherein said tape-transport means effectively changes the scanning angle of the rotary heads such that each said rotary head scans a fourth of said track.

15. The apparatus for reproducing signals according to claim 1, wherein the rotary heads further comprise:

a first pair of rotary heads disposed along a perimeter of said rotary drum; and a second pair of rotary heads disposed along said perimeter opposite said first pair.

16. The apparatus for reproducing signals according to claim 15, wherein the processing means comprises:

a tape transport means regulating a transportation rate of the tape medium and a drum rate of the rotary drum for changing the scanning angle of said heads.

17. The apparatus for reproducing signals according to claim 16, wherein the scanning angle of said heads is set equal to a track angle, said track angle being the angle between the tape-transport direction and a leading edge of a track, wherein, the first pair of rotary heads scan a first pair of adjacent tracks on a first half-revolution of the rotary drum, and wherein, the second pair of rotary heads scan a second pair of adjacent tracks on a second half-revolution of the rotary drum.

18. The apparatus for reproducing signals according to claim 17, wherein the processing means further comprises:

a memory for storing the data reproduced from said tape medium;

switching means selectively connecting the rotary heads to the memory for causing the memory to store data reproduced from said tracks and causing said memory to output a coherent signal composed from the data stored in said memory.

19. The apparatus of claim 1, wherein each track is traced by a single head when said tape speed is n times said normal speed and said rotary drum rotates at said normal rotary drum rate.

20. The apparatus of claim 1, wherein n=2.

* * * * *